US012734739B2

(12) United States Patent
Furuya et al.

(10) Patent No.: US 12,734,739 B2

(45) Date of Patent: Sep. 15, 2026

(54) MOLDING MANAGEMENT SYSTEM

(71) Applicant: SEIKO EPSON CORPORATION, Tokyo (JP)

(72) Inventors: Shusaku Furuya, Miyada (JP); Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 348 days.

(21) Appl. No.: 18/599,346

(22) Filed: Mar. 8, 2024

(65) Prior Publication Data

US 2024/0300156 A1 Sep. 12, 2024

(30) Foreign Application Priority Data

Mar. 10, 2023 (JP) ................................ 2023-037211

(51) Int. Cl.
*B29C 45/76* (2006.01)

(52) U.S. Cl.
CPC .. *B29C 45/768* (2013.01); *B29C 2945/76163* (2013.01)

(58) Field of Classification Search
None
See application file for complete search history.

(56) References Cited

U.S. PATENT DOCUMENTS

2017/0274572 A1 9/2017 Maruyama
2022/0314512 A1* 10/2022 Yamamoto ............ B33Y 50/00

FOREIGN PATENT DOCUMENTS

| | | | |
|---|---|---|---|
| EP | 3381646 | A1 | 10/2018 |
| JP | H11-300807 | A | 11/1999 |
| JP | 2017-170847 | A | 9/2017 |
| JP | 2018-171863 | A | 11/2018 |
| JP | 2019-018351 | A | 2/2019 |
| JP | 2020-131688 | A | 8/2020 |
| JP | 2021-054094 | A | 4/2021 |

* cited by examiner

*Primary Examiner* — Carlos R Ortiz Rodriguez
(74) *Attorney, Agent, or Firm* — Harness, Dickey & Pierce, P.L.C.

(57) ABSTRACT

A molding management system includes: a first acquisition unit configured to acquire first abnormality information, second abnormality information, and third abnormality information; and a first output unit configured to output first warning information. The second abnormality information and the third abnormality information include information on an injection molding machine in the first abnormality information and information on a type of an abnormality in the injection molding machine in the first abnormality information. The first acquisition unit acquires the second abnormality information after acquiring the first abnormality information and before a first period elapses therefrom, and acquires the third abnormality information after acquiring the first abnormality information and after the first period elapses therefrom. The first output unit outputs the first warning information when the first abnormality information is acquired, does not output the first warning information when the second abnormality information is acquired, and outputs the first warning information when the third abnormality information is acquired.

10 Claims, 25 Drawing Sheets

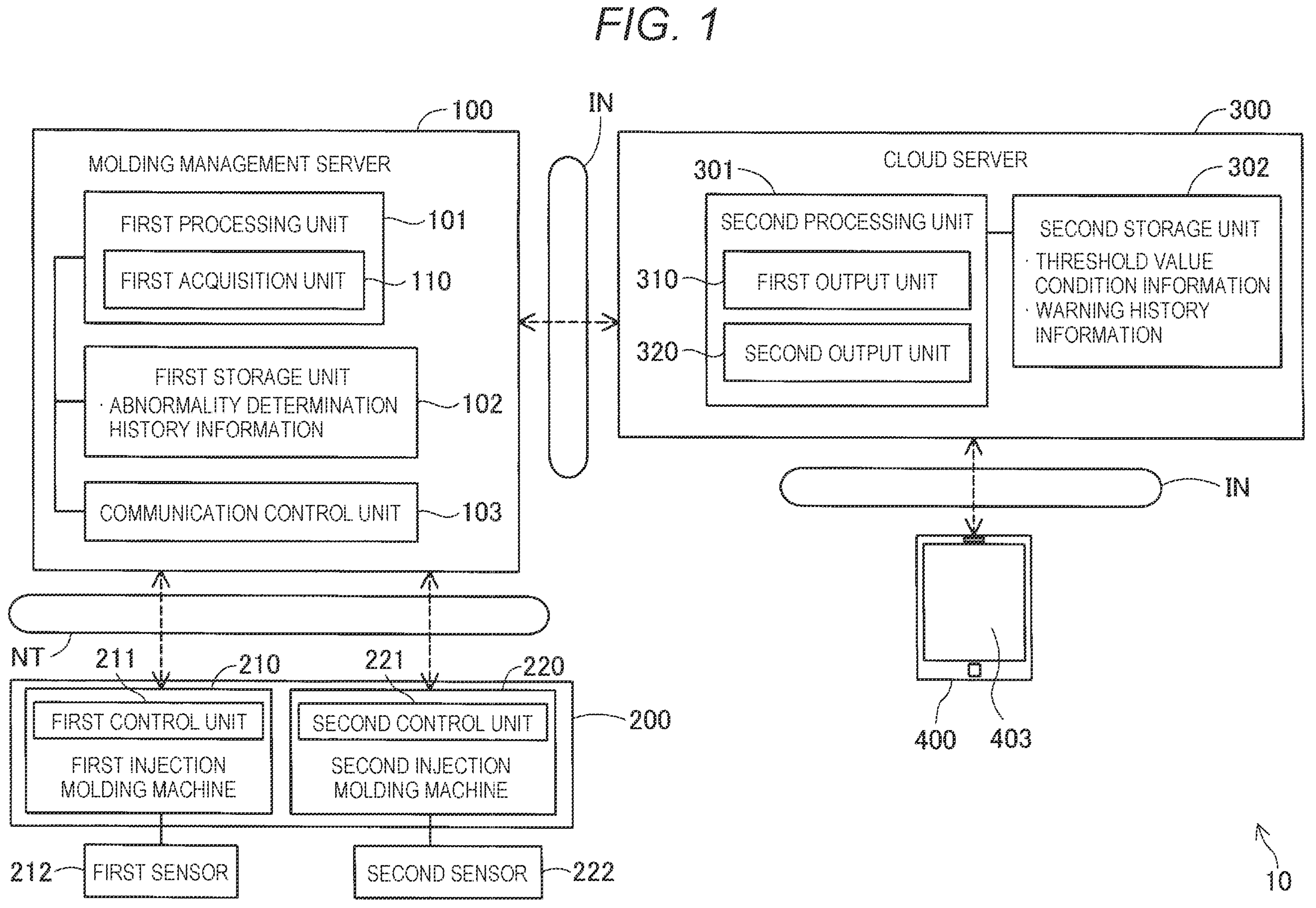
FIG. 1
100
MOLDING MANAGEMENT SERVER
FIRST PROCESSING UNIT
101
FIRST ACQUISITION UNIT
110
FIRST STORAGE UNIT
· ABNORMALITY DETERMINATION HISTORY INFORMATION
102
COMMUNICATION CONTROL UNIT
103
IN
300
CLOUD SERVER
301
SECOND PROCESSING UNIT
302
SECOND STORAGE UNIT
· THRESHOLD VALUE CONDITION INFORMATION
· WARNING HISTORY INFORMATION
310
FIRST OUTPUT UNIT
320
SECOND OUTPUT UNIT
IN
NT
211
210
221
220
FIRST CONTROL UNIT
FIRST INJECTION MOLDING MACHINE
SECOND CONTROL UNIT
SECOND INJECTION MOLDING MACHINE
200
212
FIRST SENSOR
SECOND SENSOR
222
400
403
10

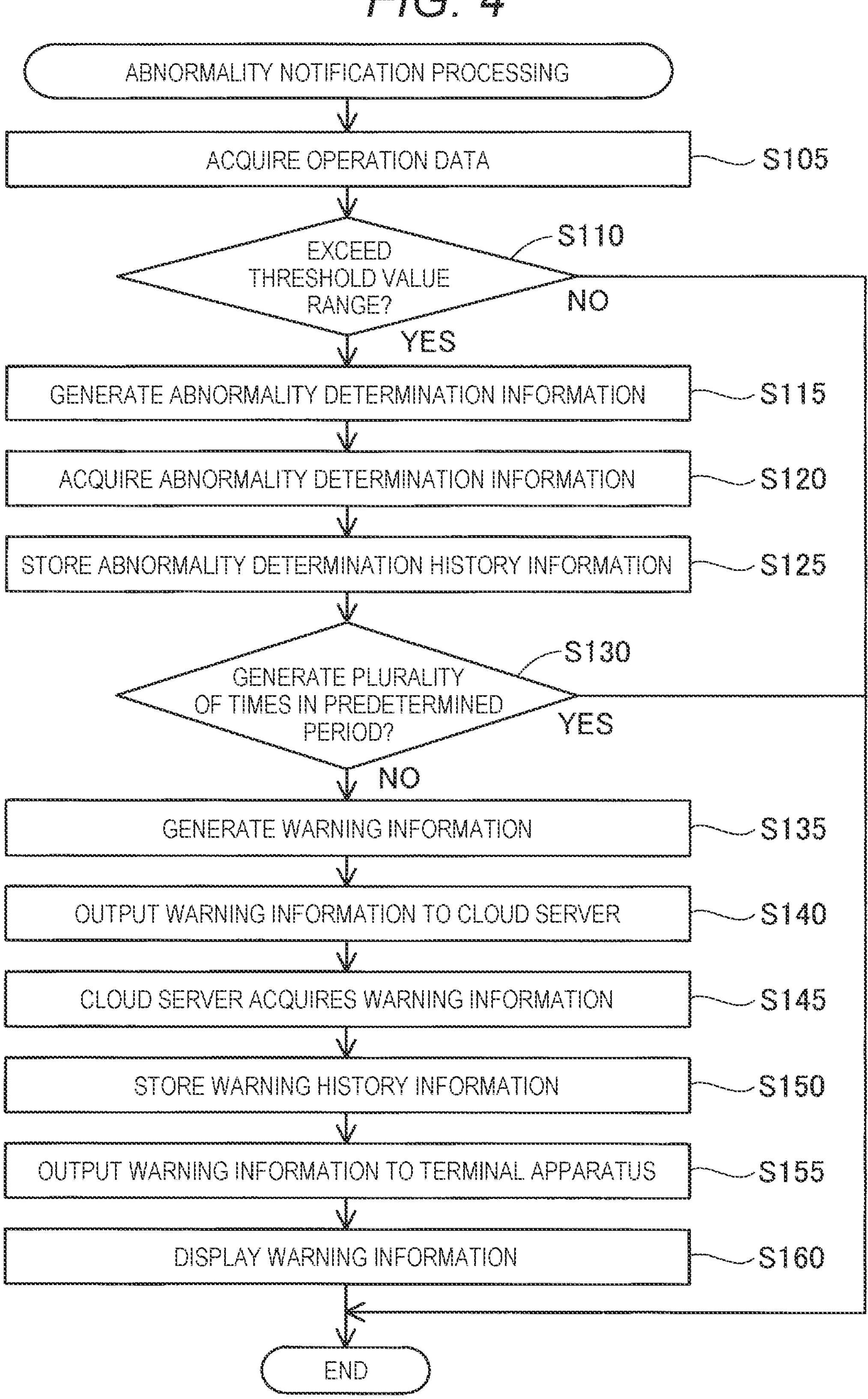
FIG. 4
ABNORMALITY NOTIFICATION PROCESSING
ACQUIRE OPERATION DATA
S105
EXCEED THRESHOLD VALUE RANGE?
S110
NO
YES
GENERATE ABNORMALITY DETERMINATION INFORMATION
S115
ACQUIRE ABNORMALITY DETERMINATION INFORMATION
S120
STORE ABNORMALITY DETERMINATION HISTORY INFORMATION
S125
GENERATE PLURALITY OF TIMES IN PREDETERMINED PERIOD?
S130
YES
NO
GENERATE WARNING INFORMATION
S135
OUTPUT WARNING INFORMATION TO CLOUD SERVER
S140
CLOUD SERVER ACQUIRES WARNING INFORMATION
S145
STORE WARNING HISTORY INFORMATION
S150
OUTPUT WARNING INFORMATION TO TERMINAL APPARATUS
S155
DISPLAY WARNING INFORMATION
S160
END (1) ACQUIRE FIRST ABNORMALITY INFORMATION
(2) OUTPUT FIRST WARNING INFORMATION
(3) ACQUIRE SECOND ABNORMALITY INFORMATION
(4) ACQUIRE THIRD ABNORMALITY INFORMATION
(5) OUTPUT FIRST WARNING INFORMATION
(6) ACQUIRE FOURTH ABNORMALITY INFORMATION
(7) OUTPUT SECOND WARNING INFORMATION
T1
T2
T3
T4
TIME
FIRST PERIOD
SECOND PERIOD

Figure 11:
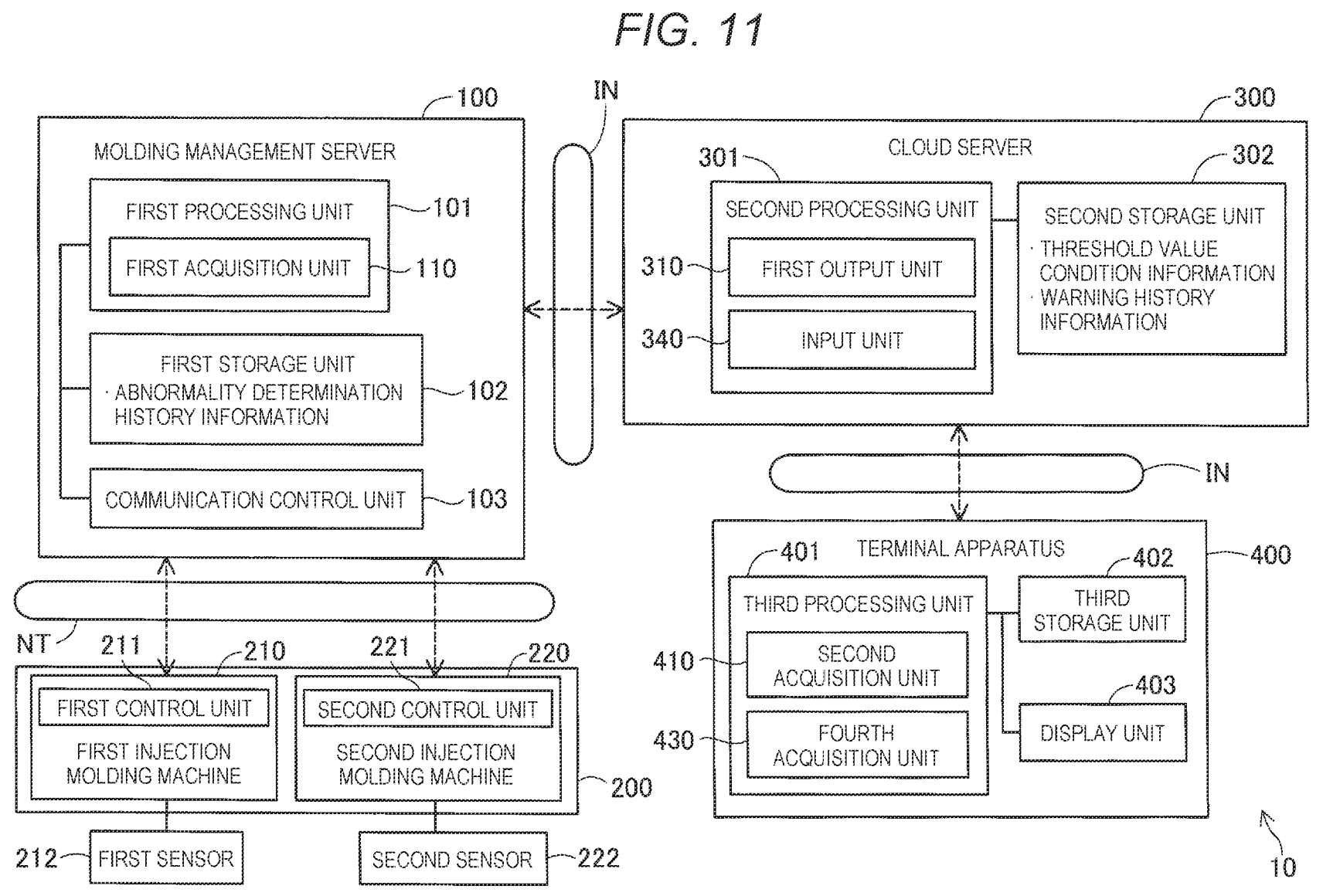

100 MOLDING MANAGEMENT SERVER
101 FIRST PROCESSING UNIT
110 FIRST ACQUISITION UNIT
102 FIRST STORAGE UNIT
· ABNORMALITY DETERMINATION HISTORY INFORMATION
103 COMMUNICATION CONTROL UNIT

IN

300 CLOUD SERVER
301 SECOND PROCESSING UNIT
310 FIRST OUTPUT UNIT
340 INPUT UNIT
302 SECOND STORAGE UNIT
· THRESHOLD VALUE CONDITION INFORMATION
· WARNING HISTORY INFORMATION

IN

400 TERMINAL APPARATUS
401 THIRD PROCESSING UNIT
410 SECOND ACQUISITION UNIT
430 FOURTH ACQUISITION UNIT
402 THIRD STORAGE UNIT
403 DISPLAY UNIT

NT 200
210 FIRST INJECTION MOLDING MACHINE
211 FIRST CONTROL UNIT
212 FIRST SENSOR
220 SECOND INJECTION MOLDING MACHINE
221 SECOND CONTROL UNIT
222 SECOND SENSOR

FIG. 12

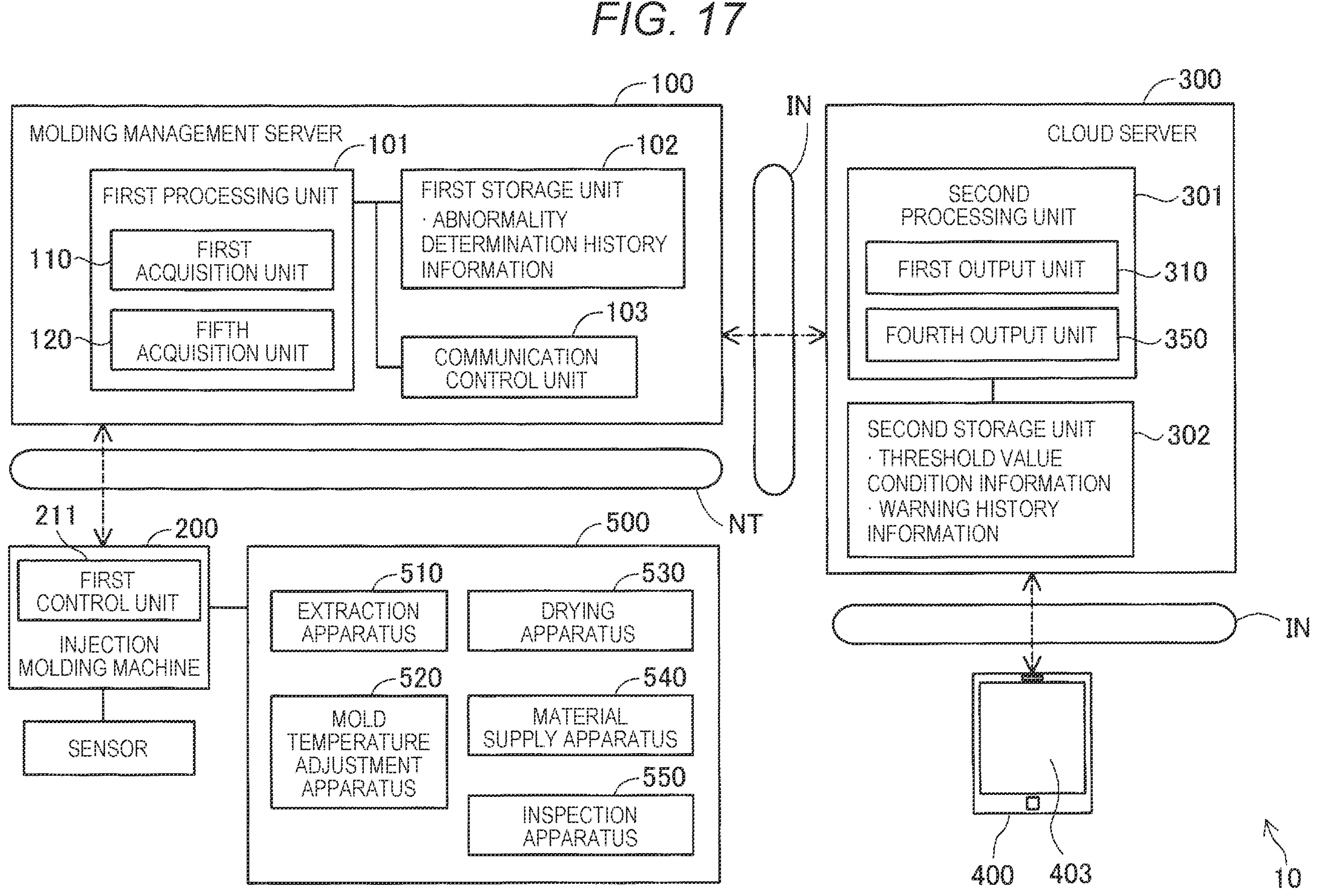

FIG. 17
MOLDING MANAGEMENT SERVER
100
FIRST PROCESSING UNIT
101
FIRST ACQUISITION UNIT
110
FIFTH ACQUISITION UNIT
120
FIRST STORAGE UNIT
· ABNORMALITY DETERMINATION HISTORY INFORMATION
102
COMMUNICATION CONTROL UNIT
103
IN
CLOUD SERVER
300
SECOND PROCESSING UNIT
301
FIRST OUTPUT UNIT
310
FOURTH OUTPUT UNIT
350
SECOND STORAGE UNIT
· THRESHOLD VALUE CONDITION INFORMATION
· WARNING HISTORY INFORMATION
302
NT
211
200
FIRST CONTROL UNIT
INJECTION MOLDING MACHINE
SENSOR
500
EXTRACTION APPARATUS
510
DRYING APPARATUS
530
MOLD TEMPERATURE ADJUSTMENT APPARATUS
520
MATERIAL SUPPLY APPARATUS
540
INSPECTION APPARATUS
550
IN
400
403
10

12:02

DESTINATION: FACTORY MANAGEMENT SUPPORT
RECEPTION DATE-AND-TIME: 2022/08/23 11:43:09
SUBJECT: APPARATUS ABNORMALITY NOTIFICATION
(MOLD TEMPERATURE ADJUSTMENT APPARATUS 1)

THIS NOTIFICATION IS TO INFORM YOU THAT AN ABNORMALITY HAS OCCURRED IN THE FOLLOWING APPARATUS.

APPARATUS NAME: MOLD TEMPERATURE ADJUSTMENT APPARATUS 1
ABNORMALITY TYPE: ABNORMALITY IN MOLD TEMPERATURE ADJUSTMENT APPARATUS
DATE-AND-TIME OF OCCURRENCE: 22/8/23 11:41:12

THIS E-MAIL IS AUTOMATICALLY SENT BY THE SYSTEM AND NO REPLY WILL BE ACCEPTED. PLEASE ACKNOWLEDGE.

FIG. 21

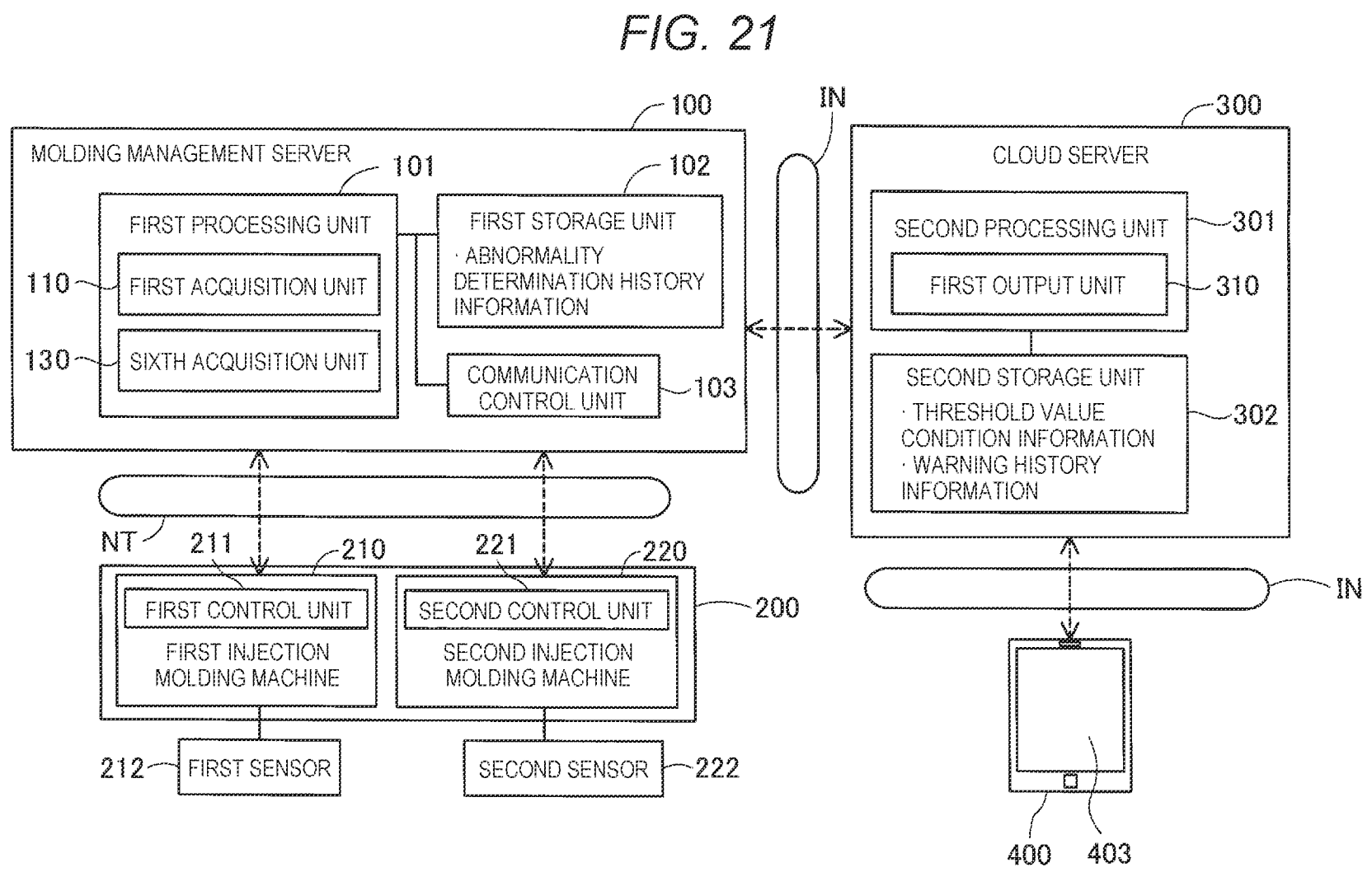

MOLDING MANAGEMENT SERVER 100
FIRST PROCESSING UNIT 101
FIRST ACQUISITION UNIT 110
SIXTH ACQUISITION UNIT 130
FIRST STORAGE UNIT 102
· ABNORMALITY DETERMINATION HISTORY INFORMATION
COMMUNICATION CONTROL UNIT 103
IN
CLOUD SERVER 300
SECOND PROCESSING UNIT 301
FIRST OUTPUT UNIT 310
SECOND STORAGE UNIT 302
· THRESHOLD VALUE CONDITION INFORMATION
· WARNING HISTORY INFORMATION
IN
400
403
NT
200
FIRST INJECTION MOLDING MACHINE 210
FIRST CONTROL UNIT 211
FIRST SENSOR 212
SECOND INJECTION MOLDING MACHINE 220
SECOND CONTROL UNIT 221
SECOND SENSOR 222

Figure 24:
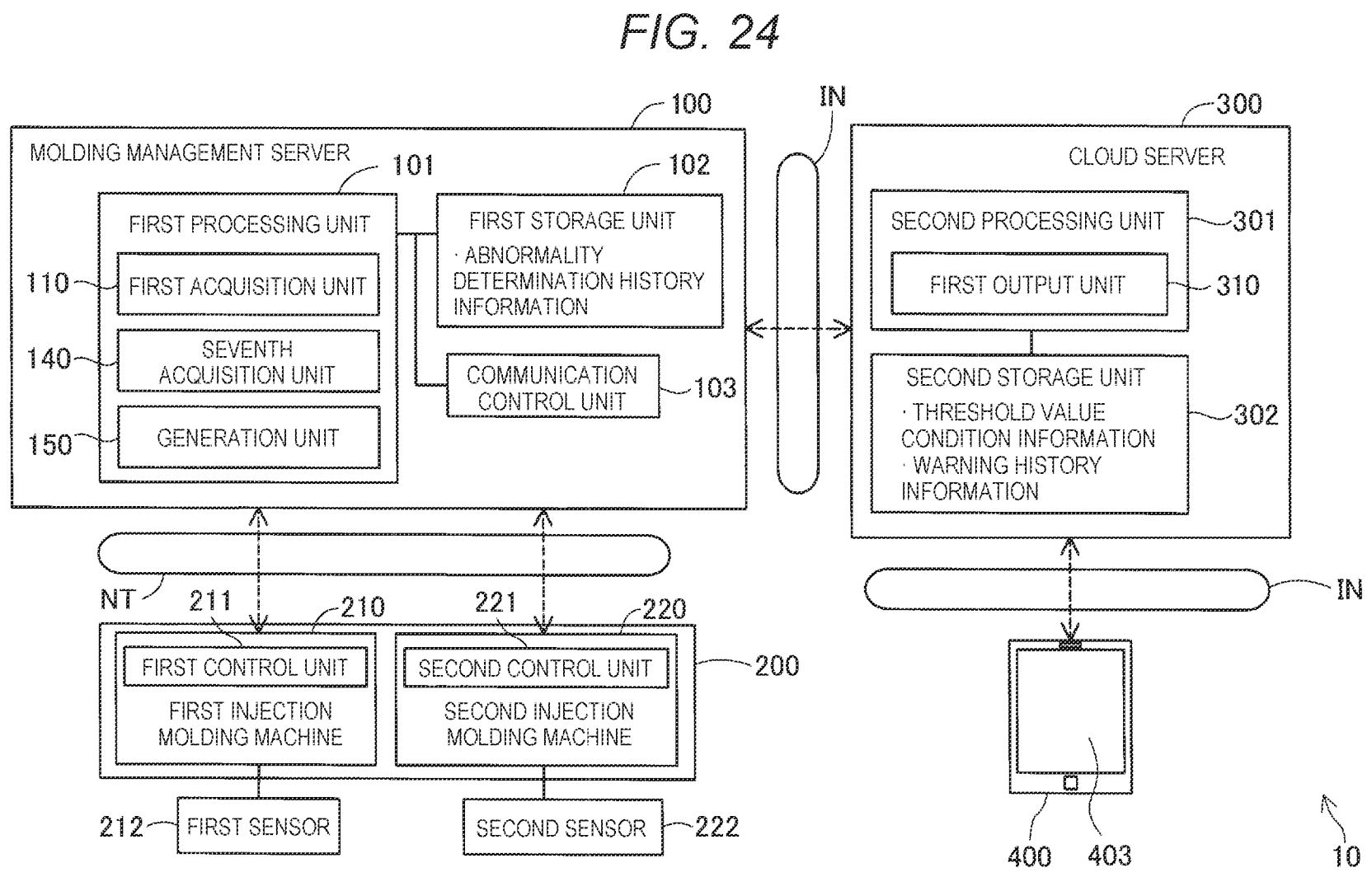

MOLDING MANAGEMENT SERVER 100

FIRST PROCESSING UNIT 101

FIRST ACQUISITION UNIT 110

SEVENTH ACQUISITION UNIT 140

GENERATION UNIT 150

FIRST STORAGE UNIT 102
· ABNORMALITY DETERMINATION HISTORY INFORMATION

COMMUNICATION CONTROL UNIT 103

IN

CLOUD SERVER 300

SECOND PROCESSING UNIT 301

FIRST OUTPUT UNIT 310

SECOND STORAGE UNIT 302
· THRESHOLD VALUE CONDITION INFORMATION
· WARNING HISTORY INFORMATION

IN

400

403

NT

200

FIRST INJECTION MOLDING MACHINE 210

FIRST CONTROL UNIT 211

FIRST SENSOR 212

SECOND INJECTION MOLDING MACHINE 220

SECOND CONTROL UNIT 221

SECOND SENSOR 222

MOLDING MANAGEMENT SYSTEM

The present application is based on, and claims priority from JP Application Serial Number 2023-037211, filed Mar. 10, 2023, the disclosure of which is hereby incorporated by reference herein in its entirety.

BACKGROUND

1. Technical Field

The present disclosure relates to a molding management system.

2. Related Art

JP-A-11-300807 discloses a molding equipment group management system that manages a plurality of molding lines. In this molding equipment group management system, when an abnormality occurs in an injection molding machine or peripheral equipment thereof, an alarm is displayed on an alarm display board and a portable display apparatus.

JP-A-11-300807 is an example of the related art.

A molding management system may notify a user of information indicating that an abnormality occurs in an injection molding machine in a case where operation data exceeds a predetermined threshold value when the operation data is acquired from the injection molding machine. This information includes information on the injection molding machine in which the abnormality occurs and information on a type of the abnormality. In such a molding management system, information on the same contents is notified to the user each time the operation data is acquired until an abnormality of a specific type occurring in a specific injection molding machine is resolved. Thus, in a case where information indicating that the abnormality of the specific type occurs in the specific injection molding machine is notified to the user several times, even when information indicating that an abnormality of another type occurs in the specific injection molding machine or information indicating that an abnormality occurs in another injection molding machine is notified to the user, the user may overlook the information.

SUMMARY

According to a first aspect of the disclosure, a molding management system is provided. The molding management system is a molding management system that manages an injection molding machine, the molding management system including: a first acquisition unit configured to acquire first abnormality information, second abnormality information, and third abnormality information including information on the injection molding machine and information on a type of an abnormality occurring in the injection molding machine; and a first output unit configured to output first warning information that is information notifying that the abnormality occurs in the injection molding machine, in which the second abnormality information and the third abnormality information include the information on the injection molding machine in the first abnormality information and the information on the type of the abnormality in the injection molding machine in the first abnormality information, the first acquisition unit acquires the second abnormality information after acquiring the first abnormality information and before a first period elapses from a time point when the first abnormality information is acquired, and acquires the third abnormality information after acquiring the first abnormality information and after the first period elapses from the time point when the first abnormality information is acquired, and the first output unit outputs the first warning information when the first acquisition unit acquires the first abnormality information, does not output the first warning information when the first acquisition unit acquires the second abnormality information, and outputs the first warning information when the first acquisition unit acquires the third abnormality information.

According to a second aspect of the disclosure, a molding management system is provided. The molding management system is a molding management system that manages an injection molding machine, the molding management system including: a server; and a terminal apparatus, in which the server includes: a first acquisition unit configured to acquire first abnormality information, second abnormality information, and third abnormality information including information on the injection molding machine and information on a type of an abnormality occurring in the injection molding machine; and a first output unit configured to output first warning information, second warning information, and third warning information that are information notifying that the abnormality occurs in the injection molding machine, the second abnormality information and the third abnormality information including the information on the injection molding machine in the first abnormality information and the information on the type of the abnormality in the injection molding machine in the first abnormality information, the first output unit being configured to output the first warning information to the terminal apparatus when the first acquisition unit acquires the first abnormality information, output the second warning information to the terminal apparatus when the first acquisition unit acquires the second abnormality information, and output the third warning information to the terminal apparatus when the first acquisition unit acquires the third abnormality information, and the terminal apparatus includes: an eighth acquisition unit configured to acquire the first warning information, the second warning information, and the third warning information; and a fifth output unit configured to output warning notification information that is information notifying that the abnormality occurs in the injection molding machine, the eighth acquisition unit being configured to acquire the second warning information after acquiring the first warning information and before a first period elapses from a time point when the first warning information is acquired, and acquire the third warning information after acquiring the first warning information and after the first period elapses from the time point when the first warning information is acquired, and the fifth output unit being configured to output the warning notification information when the eighth acquisition unit acquires the first warning information, not output the warning notification information when the eighth acquisition unit acquires the second warning information, and output the warning notification information when the eighth acquisition unit acquires the third warning information.

BRIEF DESCRIPTION OF THE DRAWINGS

FIG. 1 is an explanatory diagram showing a schematic configuration of a molding management system.

FIG. 4 is a flowchart of abnormality notification processing.

FIG. 11 is an explanatory diagram showing a schematic configuration of a molding management system in a third embodiment.

FIG. 12 is a flowchart of abnormality resolution processing for first warning information performed in the third embodiment.

FIG. 17 is an explanatory diagram showing a schematic configuration of a molding management system in a fifth embodiment.

FIG. 19 shows an example of a peripheral equipment warning information notification screen.

FIG. 21 is an explanatory diagram showing a schematic configuration of a molding management system in a sixth embodiment.

FIG. 24 is an explanatory diagram showing a schematic configuration of a molding management system in a seventh embodiment.

DESCRIPTION OF EMBODIMENTS

A. First Embodiment

Figure 2:
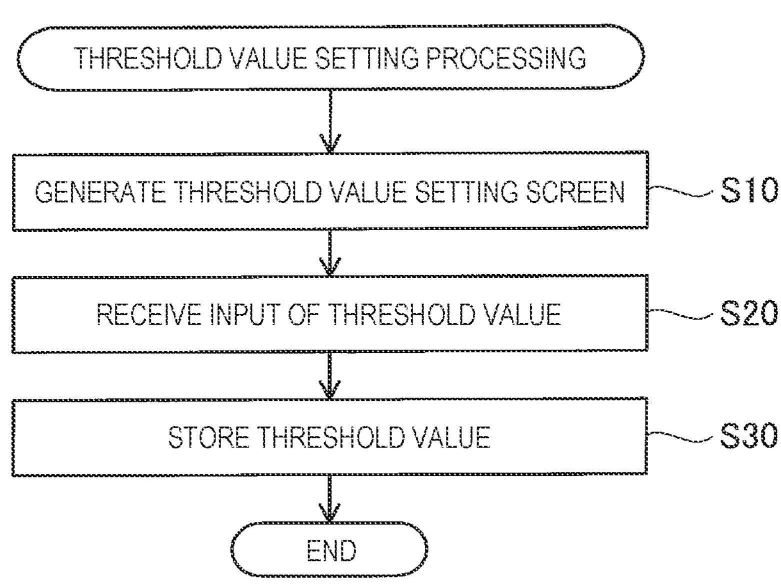
FIG. 2 is a flowchart of threshold value setting processing.

FIG. 1 is an explanatory diagram showing a schematic configuration of a molding management system 10. The molding management system 10 includes a molding management server 100, a first injection molding machine 210, a first sensor 212, a second injection molding machine 220, a second sensor 222, a cloud server 300, and a terminal apparatus 400. The molding management server 100 is communicable with the first injection molding machine 210 and the second injection molding machine 220 via a network NT. The network NT may be, for example, a LAN, a WAN, or the Internet. The cloud server 300 is communicable with the molding management server 100 and the terminal apparatus 400 via the Internet IN. The molding management system 10 may include peripheral equipment such as an extraction robot that extracts a molded article from the first injection molding machine 210 or the second injection molding machine 220, a dryer that dries a material used in the first injection molding machine 210 or the second injection molding machine 220, and an inspection apparatus that inspects a molded article molded by the first injection molding machine 210 or the second injection molding machine 220. FIG. 1 shows an example in which the molding management system 10 includes one terminal apparatus 400, and the molding management system 10 may include a plurality of terminal apparatuses 400.

The first injection molding machine 210 is an apparatus that performs injection molding. The first injection molding machine 210 includes a first control unit 211, a mold clamping unit (not shown), and an injection unit (not shown). The mold clamping unit opens and closes a mold that is attached to the mold clamping unit and has a cavity. The mold may be made of metal, ceramic, or resin. A mold that is made of metal is referred to as a metal mold. The injection unit injects, into the cavity of the mold, a molding material obtained by plasticizing a material. The first control unit 211 is implemented by a computer including one or a plurality of processors, a storage apparatus, and an input and output interface for inputting and outputting signals from and to the outside. The first control unit 211 may be implemented by a plurality of computers.

The first control unit 211 controls each unit of the first injection molding machine 210 based on a molding condition acquired from the cloud server 300 via the molding management server 100, and thus performs injection molding to mold a molded article. More specifically, the first control unit 211 controls the mold clamping unit to clamp the mold, and controls the injection unit to inject the molding material into the mold, thereby molding a molded article having a shape corresponding to a shape of the cavity provided in the mold.

The first sensor 212 measures a physical quantity related to an operation state of the first injection molding machine 210. The physical quantity related to the operation state of the first injection molding machine 210 is a temperature of the injection unit, a pressure of the molding material in the injection unit, a cushion position, a temperature of a melting unit that plasticizes the material, a temperature of the mold, a pressure of the molding material filled in the mold, an amount of distortion of the mold, a mold clamping force of the mold clamping unit, or the like. Here, the cushion position is a position of a tip of a plunger of the injection unit when the molding material is filled into the cavity of the mold by moving the plunger. The first sensor 212 is a temperature sensor that measures the temperature of the injection unit, a pressure sensor that measures the pressure of the molding material in the injection unit, a displacement sensor that measures an amount of displacement of the plunger, or the like. Hereinafter, the physical quantity related to the operation state of the first injection molding machine 210 measured by the first sensor 212 is also referred to as operation data of the first injection molding machine 210. The first sensor 212 measures a plurality of types of operation data of the first injection molding machine 210.

The first control unit 211 acquires the operation data of the first injection molding machine 210 from the first sensor 212 and stores the operation data in a storage apparatus (not shown) of the first injection molding machine 210. The first control unit 211 transmits the operation data stored in the storage apparatus to the molding management server 100 at a predetermined cycle or at a timing when the first injection molding machine 210 performs a specific operation. The timing of the specific apparatus operation is, for example, when the mold is opened or when the mold is closed. The first sensor 212 may be communicable with the molding management server 100 via the network NT. In this case, the first sensor 212 may transmit the measured operation data of the first injection molding machine 210 to the molding management server 100 via the network NT.

The second injection molding machine 220 includes a second control unit 221. The second injection molding machine 220 has the same configuration as the first injection molding machine 210. The second control unit 221 has the same configuration as the first control unit 211. Therefore, a detailed description of the second injection molding machine 220 and the second control unit 221 will be omitted. Hereinafter, when each injection molding machine is referred to without distinction, the injection molding machine is simply referred to as an injection molding machine 200. The molding management system 10 may include one or three or more injection molding machines 200.

The second sensor 222 has the same configuration as the first sensor 212. Therefore, a detailed description of the second sensor 222 is omitted. Hereinafter, when each sensor is referred to without distinction, the sensor is simply referred to as a sensor.

The molding management server 100 is implemented by a computer including a first processing unit 101, a first storage unit 102, and a communication control unit 103. The first processing unit 101 includes one or more processors and a main storage apparatus. The first storage unit 102 is implemented by an auxiliary storage apparatus such as a hard disk drive. The communication control unit 103 includes a communication circuit for controlling communication with another apparatus such as the cloud server 300 and the injection molding machine 200. The molding management server 100 may be implemented by a plurality of computers.

The first processing unit 101 acquires operation data of the injection molding machine 200 transmitted from the injection molding machine 200. The operation data of the injection molding machine 200 acquired by the first processing unit 101 is stored in the first storage unit 102. The first processing unit 101 may transmit the operation data of the injection molding machine 200 to the cloud server 300. In this case, the operation data of the injection molding machine 200 is stored in a second storage unit 302 of the cloud server 300. When the first sensor 212 is communicable with the molding management server 100 via the network NT, the first processing unit 101 may acquire the operation data of the injection molding machine 200 from the sensor.

The first processing unit 101 includes a first acquisition unit 110. The first acquisition unit 110 is implemented by the first processing unit 101 executing a program stored in the first storage unit 102. Alternatively, the first acquisition unit 110 may be implemented by a circuit.

The first acquisition unit 110 acquires abnormality determination information. The abnormality determination information will be described later.

The first storage unit 102 stores abnormality determination history information. The abnormality determination history information will be described later.

The cloud server 300 is a server used via the Internet IN. The cloud server 300 includes a second processing unit 301 and the second storage unit 302. The first storage unit 102 of the molding management server 100 and the second storage unit 302 of the cloud server 300 are also collectively referred to as a storage unit. The molding management server 100 and the cloud server 300 may be implemented as a single server.

The second processing unit 301 of the cloud server 300 includes a first output unit 310 and a second output unit 320. The first output unit 310 and the second output unit 320 are implemented by the second processing unit 301 executing a program stored in the second storage unit 302. Alternatively, each of the first output unit 310 and the second output unit 320 may be implemented by a circuit.

The first output unit 310 and the second output unit 320 output warning information. The warning information will be described later.

The second storage unit 302 stores threshold value condition information and warning history information. The threshold value condition information is information on a threshold value of the operation data of the injection molding machine 200. In the present specification, the threshold value is a value used for abnormality determination of the operation data. The threshold value condition information includes an upper limit value of the threshold value of the operation data of the injection molding machine 200 and a lower limit value of the threshold value of the operation data of the injection molding machine 200. The threshold value condition information includes, for example, an upper limit value and a lower limit value of the temperature of the injection unit, and an upper limit value and a lower limit value of the pressure of the molding material in the injection unit. The threshold value condition information may be only the upper limit value of the threshold value of the operation data of the injection molding machine 200 or only the lower limit value of the threshold value of the operation data of the injection molding machine 200. The warning history information will be described later.

The terminal apparatus 400 is implemented as a computer including a CPU, a storage apparatus, and a display unit 403. As the terminal apparatus 400, for example, a tablet terminal, a notebook PC, a smartphone, or a handy terminal can be applied. The display unit 403 displays various screens output from the cloud server 300. The display unit 403 may have a touch panel function. The terminal apparatus 400 is also referred to as an information terminal.

FIG. 2 is a flowchart of threshold value setting processing performed by the molding management system 10. The threshold value setting processing is processing of storing, in the second storage unit 302, threshold value condition information specified by a user. The threshold value setting processing is performed when a predetermined operation is performed on the molding management system 10 before a molded article is molded by the injection molding machine 200. The threshold value condition information may be stored in the second storage unit 302 in advance.

In step S10 in FIG. 2, the second processing unit 301 of the cloud server 300 generates data representing a threshold value setting screen SC1, which is a screen for the user to set the threshold value of the operation data of the injection molding machine 200. The threshold value setting screen SC1 is displayed on the display unit 403 of the terminal apparatus 400.

Figure 3:
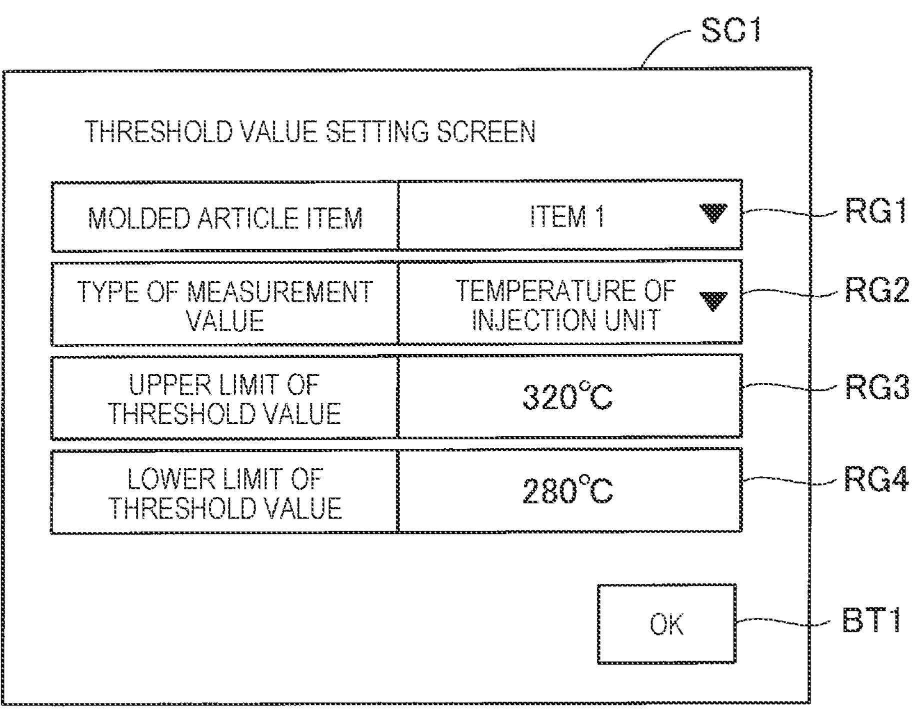
FIG. 3 shows a threshold value setting screen.

FIG. 3 shows the threshold value setting screen SC1. The threshold value setting screen SC1 is provided with a display area RG1 where an item name of a molded article is displayed, a display area RG2 where a type name of a measurement value is displayed, a display area RG3 where the upper limit value of the threshold value is displayed, a display area RG4 where the lower limit value of the threshold value is displayed, and an OK button BT1. Here, the type name of the measurement value is a name of the physical quantity measured by the sensor, and is, for example, the temperature of the injection unit or the pressure of the molding material in the injection unit. The display area RG1 and the display area RG2 are provided such that a list of items of molded articles and a list of type names of measurement values are respectively displayed when the user clicks the areas. The upper limit value of the threshold value and the lower limit value of the threshold value are input by the user to the display area RG3 and the display area RG4, respectively.

In step S20 in FIG. 2, the second processing unit 301 receives input of information from the display area RG1 to the display area RG4 on the threshold value setting screen SC1. The user selects an item of a molded article for which the threshold value is to be set in the display area RG1 on the threshold value setting screen SC1 displayed on the display unit 403 of the terminal apparatus 400, and selects, in the display area RG2, a type name of a measurement value whose threshold value is to be set for the item selected in the display area RG1. The user inputs, in the display area RG3 and the display area RG4, respectively, the upper limit value of the threshold value and the lower limit value of the threshold value corresponding to the type of the measurement value of the item selected in the display area RG1 and the display area RG2, and clicks the OK button BT1. The user may not input the upper limit value of the threshold value into the display area RG3. In addition, the user may not input the lower limit value of the threshold value into the display area RG4.

In step S30, the second processing unit 301 stores the item name of the molded article selected in the display area RG1 on the threshold value setting screen SC1, the type name of the measurement value selected in the display area RG2, the upper limit value of the threshold value input into the display area RG3, and the lower limit value of the threshold value input into the display area RG4 in the second storage unit 302 in association with one another. As described above, threshold value changing processing is performed.

FIG. 4 is a flowchart of abnormality notification processing performed by the molding management system 10. The abnormality notification processing is performed each time the operation data is transmitted from the injection molding machine 200. Before the injection molding machine 200 starts molding the molded article, the first processing unit 101 acquires the threshold value condition information from the second storage unit 302 and stores the threshold value condition information in the first storage unit 102.

In step S105, the first processing unit 101 acquires the operation data of the injection molding machine 200 transmitted from the injection molding machine 200. The first processing unit 101 may acquire the operation data of the injection molding machine 200 transmitted from the sensor.

In step S110, the first processing unit 101 determines, using the threshold value condition information, whether the operation data of the injection molding machine 200 acquired in step S105 exceeds a threshold value range. Here, the operation data exceeding the threshold value range means that an upper limit value of a measurement value of the physical quantity of the operation state of the injection molding machine 200 in the operation data exceeds the upper limit value of the threshold value corresponding to the measurement value, or a lower limit value of the measurement value falls below the lower limit value of the threshold value corresponding to the measurement value. For example, the first processing unit 101 determines whether a measurement value of the temperature of the injection unit exceeds an upper limit value of a threshold value of the temperature of the injection unit, and whether the measurement value of the temperature of the injection unit falls below a lower limit value of the threshold value of the temperature of the injection unit.

When it is determined in step S110 that the operation data exceeds the threshold value range, the first processing unit 101 generates the abnormality determination information in step S115. In step S110, when it is determined that the operation data does not exceed the threshold value range, the first processing unit 101 ends the abnormality notification processing.

The abnormality determination information includes generation date-and-time information, identification information of the injection molding machine 200, the type name of the measurement value, the measurement value, and the threshold value. The generation date-and-time information is date and time when the abnormality determination information is generated. The identification information of the injection molding machine 200 is a name of the injection molding machine 200, an ID number assigned to each injection molding machine 200, or the like. That is, the abnormality determination information includes the identification information of the injection molding machine 200, which is information on the injection molding machine 200, and the type name of the measurement value, which is information on a type of an abnormality occurring in the injection molding machine 200.

The identification information of the injection molding machine 200 in the abnormality determination information generated in step S115 is the identification information of the injection molding machine 200 whose operation data is determined to exceed the threshold value range in step S110. The type name of the measurement value in the abnormality determination information generated in step S115 is the name of the measurement value whose threshold value range is exceeded by the operation data. The measurement value in the abnormality determination information generated in step S115 is a value of the measurement value whose threshold value range is exceeded by the operation data. The threshold value in the abnormality determination information generated in step S115 is a value of a threshold value corresponding to the measurement value whose threshold value range is exceeded by the operation data.

The abnormality determination information may include a type name of abnormality determination. The type name of the abnormality determination is information on a behavior of the operation data. The type name of the abnormality determination is, for example, out-of-management-limit, continuing, rising, lowering, or alternately-increasing-and-decreasing. The out-of-management-limit is applied to a case where the operation data exceeds the threshold value range. The continuing is applied to a case where nine consecutive points among acquired measurement values are higher than a reference value serving as a reference of the physical quantity or lower than the reference value. The rising is applied to a case where six consecutive points among the acquired measurement values increase from one previous measurement value. The lowering is applied to a case where six consecutive points among the acquired measurement values decrease from one previous measurement value. The alternately-increasing-and-decreasing is applied to a case where fourteen consecutive points among the acquired measurement values alternately increase and decrease. The abnormality determination information may include the operation data of the injection molding machine 200.

In step S120, the first acquisition unit 110 acquires the abnormality determination information generated in step S115.

In step S125, the first processing unit 101 stores, in the first storage unit 102, the abnormality determination history information including the abnormality determination information generated in step S115. In other words, the first processing unit 101 adds a record of the abnormality determination history information to the first storage unit 102.

The abnormality determination history information includes the abnormality determination information, an abnormality determination history ID, and an abnormality-determination-related code. The abnormality determination history ID is an ID number assigned to each piece of abnormality determination information. The abnormality-determination-related code is information indicating a relation between records of the abnormality determination history information.

The abnormality-determination-related code is an abnormality determination history ID of its own abnormality determination history information or an abnormality determination history ID of abnormality determination history information already stored in the first storage unit 102. First, a case where the same abnormality determination information is not generated in a predetermined period will be described. The same abnormality determination information refers to abnormality determination information including the identification information of the injection molding machine 200 and the type name of the measurement value that match the identification information of the injection molding machine 200 and the type name of the measurement value in the abnormality determination information generated in step S115. The predetermined period is a period from a predetermined time point to a time point when the abnormality determination information is generated in step S115. The predetermined period is, for example, 30 minutes immediately before the abnormality determination information is generated in step S115 or 10 minutes immediately before the abnormality determination information is generated in step S115. The predetermined period may be stored in the first storage unit 102 in advance or may be specified by the user. In the above-described case, the abnormality-determination-related code of the abnormality determination history information stored in the first storage unit 102 in step S125 is the abnormality determination history ID of its own abnormality determination history information. Next, a case where the same abnormality determination information is generated in the predetermined period will be described. In this case, the abnormality-determination-related code of the abnormality determination history information stored in the first storage unit 102 in step S125 is the abnormality determination history ID of the abnormality determination history information including the same abnormality determination information as that generated first within the predetermined period.

In step S130, the first processing unit 101 determines whether the same abnormality determination information is generated in the predetermined period. That is, the first processing unit 101 determines whether the abnormality determination history information including the same abnormality-determination-related code as the abnormality-determination-related code of the abnormality determination history information stored in the first storage unit 102 in step S125 is stored in the first storage unit 102.

When it is determined in step S130 that the same abnormality determination information is not generated in the predetermined period, step S135 is performed. When it is determined in step S130 that the same abnormality determination information is generated in the predetermined period, the first processing unit 101 ends the abnormality notification processing.

In step S135, the first processing unit 101 generates the warning information. The warning information is information notifying that an abnormality occurs in the injection molding machine 200. The warning information includes the abnormality determination information, the abnormality determination history ID, and the abnormality-determination-related code. The first processing unit 101 generates the warning information including the abnormality determination information, the abnormality determination history ID, and the abnormality-determination-related code in the abnormality determination history information stored in the first storage unit 102 in step S125.

In step S140, the first processing unit 101 outputs the warning information generated in step S135 to the cloud server 300. The first processing unit 101 may output, to the cloud server 300 together with the warning information, the operation data of the injection molding machine 200 corresponding to the identification information of the injection molding machine 200 in the warning information.

In step S145, the second processing unit 301 of the cloud server 300 acquires the warning information output in step S140.

In step S150, the second processing unit 301 of the cloud server 300 stores, in the second storage unit 302, the warning information acquired in step S145 as the warning history information. In other words, the second processing unit 301 adds a record of the warning history information to the second storage unit 302. The warning history information includes the abnormality determination information, the abnormality determination history ID, and the abnormality-determination-related code. The warning history information may not include the abnormality-determination-related code.

In step S155, the second processing unit 301 outputs the warning information acquired in step S145 to the terminal apparatus 400. At this time, the second processing unit 301 may output the warning information excluding the abnormality-determination-related code to the terminal apparatus 400. The second processing unit 301 transmits the warning information to the terminal apparatus 400 in a form such as an e-mail or a message. The second processing unit 301 may cause the terminal apparatus 400 to output a warning sound or may cause the terminal apparatus 400 to vibrate.

In step S160, the terminal apparatus 400 displays the warning information output in step S155 on the display unit 403.

Figure 5:
FIG. 5 shows an example of a warning information notification screen SC2.

FIG. 5 shows an example of a warning information notification screen SC2 displayed on the display unit 403 of the terminal apparatus 400 in step S160 in the abnormality notification processing shown in FIG. 4. In the example shown in FIG. 5, contents of the e-mail transmitted from the cloud server 300 to the terminal apparatus 400 are displayed on the warning information notification screen SC2. The warning information notification screen SC2 displays the identification information of the injection molding machine 200 and the type name of the measurement value in the warning information output in step S155 in the abnormality notification processing shown in FIG. 4. As described above, the abnormality notification processing is performed.

Hereinafter, a timing when the warning information is output in a case where a plurality of pieces of abnormality determination information including the same identification information of the injection molding machine 200 and the same type name of the measurement value are acquired at time intervals will be described.

Figure 6:
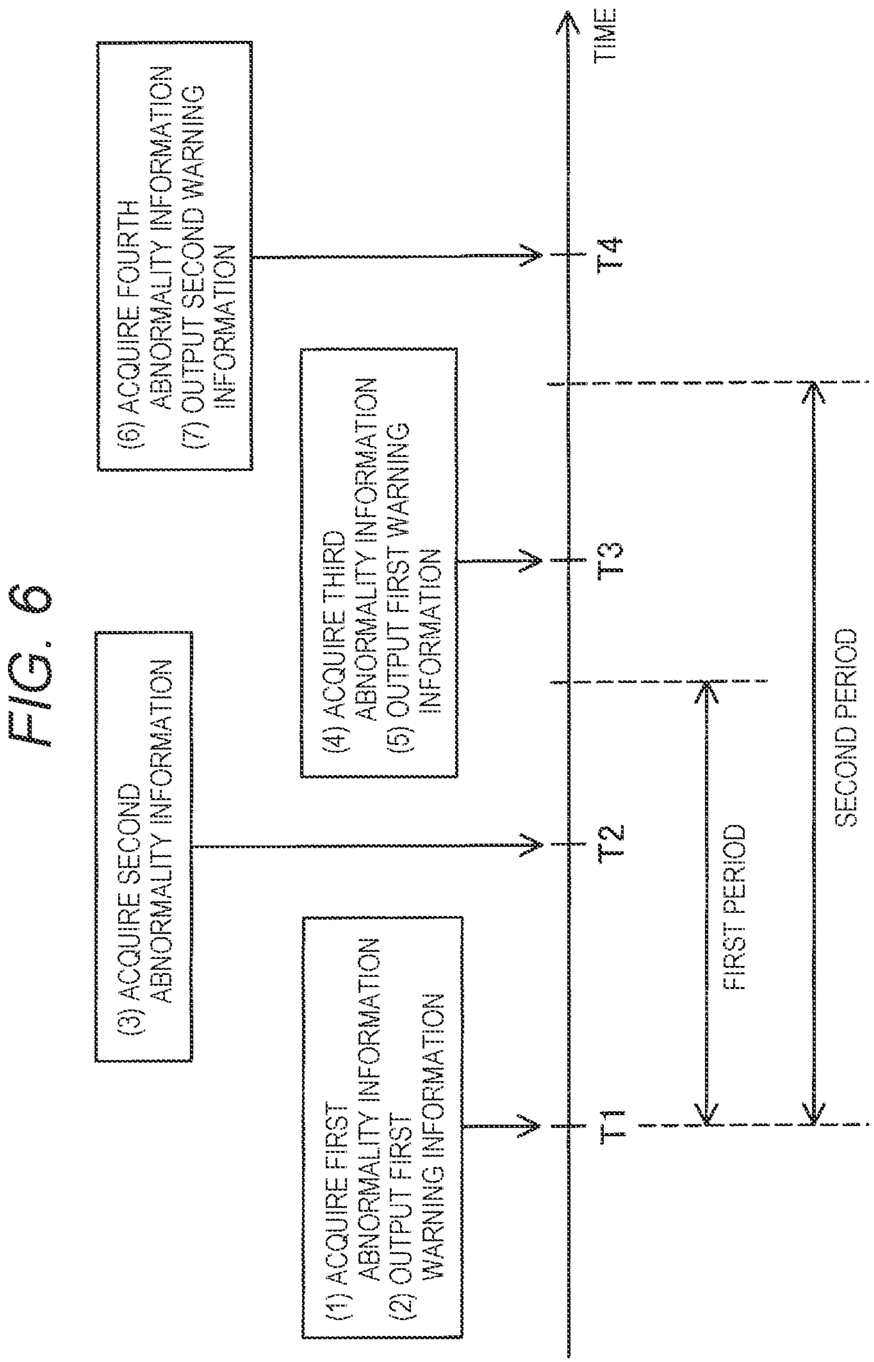
FIG. 6 is a time chart showing a timing when warning information is output.

FIG. 6 is a time chart showing the timing when the warning information is output. FIG. 6 shows a case where one piece of abnormality determination information including the same identification information of the injection molding machine 200 and the same type name of the measurement value is acquired after one piece of abnormality determination information is acquired and before a first period elapses therefrom, one piece of abnormality determination information including the same identification information of the injection molding machine 200 and the same type name of the measurement value is acquired after the first period elapses and before a second period elapses, and one piece of abnormality determination information including the same identification information of the injection molding machine 200 and the same type name of the measurement value is acquired after the second period elapses.

First, at time T1, the first acquisition unit 110 of the molding management server 100 acquires first abnormality information, which is the abnormality determination information. The acquisition of the first abnormality information by the first acquisition unit 110 corresponds to step S120 in the abnormality notification processing shown in FIG. 4. It is assumed that the first acquisition unit 110 does not acquire any abnormality determination information including the same identification information of the injection molding machine 200 and the same type name of the measurement value during a period from a time point preceding the time T1 by the first period to the time T1.

When the first acquisition unit 110 acquires the first abnormality information, the first output unit 310 of the cloud server 300 outputs first warning information to the terminal apparatus 400. The first warning information is warning information the including first abnormality information. The output of the first warning information by the first output unit 310 corresponds to step S155 in the abnormality notification processing shown in FIG. 4. A reason why the first warning information is output when the first abnormality information is acquired is that it is determined that the same abnormality determination information is not generated in the predetermined period when the first period is used as the predetermined period in step S130 in the abnormality notification processing. The first output unit 310 may output the first warning information to the molding management server 100 or the injection molding machine 200.

At time T2, the first acquisition unit 110 acquires second abnormality information. The second abnormality information is abnormality determination information including the identification information of the injection molding machine 200 and the type name of the measurement value in the first abnormality information. The time T2 is a time before the first period elapses from the time T1. That is, after acquiring the first abnormality information, the first acquisition unit acquires 110 the second abnormality information before the first period elapses from the time point when the first abnormality information is acquired. The acquisition of the second abnormality information by the first acquisition unit 110 corresponds to step S120 in the abnormality notification processing shown in FIG. 4.

When the first acquisition unit 110 acquires the second abnormality information, the first output unit 310 does not output the first warning information to the terminal apparatus 400. That is, step S155 in the abnormality notification processing shown in FIG. 4 is not performed. A reason why the first warning information is not output when the first acquisition unit 110 acquires the second abnormality information is that it is determined that the same abnormality determination information is generated in the predetermined period when the first period is used as the predetermined period in step S130 in the abnormality notification processing.

At time T3, the first acquisition unit 110 acquires third abnormality information. The third abnormality information is abnormality determination information including the identification information of the injection molding machine 200 and the type name of the measurement value in the first abnormality information. The time T3 is a time after the first period elapses from the time T1 and before the second period elapses from the time T1. That is, after acquiring the first abnormality information, the first acquisition unit 110 acquires the third abnormality information after the first period elapses from the time point when the first abnormality information is acquired and before the second period elapses from the time point when the first abnormality information is acquired. The acquisition of the third abnormality information by the first acquisition unit 110 corresponds to step S120 in the abnormality notification processing shown in FIG. 4.

When the first acquisition unit 110 acquires the third abnormality information, the first output unit 310 outputs the first warning information to the terminal apparatus 400. The output of the first warning information by the first output unit 310 corresponds to step S155 in the abnormality notification processing shown in FIG. 4. A reason why the first warning information is output when the third abnormality information is acquired is that it is determined that the same abnormality determination information is not generated in the predetermined period when the first period is used as the predetermined period in step S130 in the abnormality notification processing.

When the first acquisition unit 110 acquires the third abnormality information, the second output unit 320 of the cloud server 300 does not output second warning information to the terminal apparatus 400. The second warning information is warning information including the first abnormality information. That is, step S120 in the abnormality notification processing shown in FIG. 4 is not performed. A reason why the second warning information is not output when the first acquisition unit 110 acquires the third abnormality information is that it is determined that the same abnormality determination information is generated in the predetermined period when the second period is used as the predetermined period in step S130 in the abnormality notification processing.

At time T4, the first acquisition unit 110 acquires fourth abnormality information. The fourth abnormality information is abnormality determination information including the identification information of the injection molding machine 200 and the type name of the measurement value in the first abnormality information. The time T4 is a time after the second period elapses from the time T1. That is, after acquiring the first abnormality information, the first acquisition unit 110 acquires the fourth abnormality information after the second period elapses from the time point when the first abnormality information is acquired. The acquisition of the fourth abnormality information by the first acquisition unit 110 corresponds to step S120 in the abnormality notification processing shown in FIG. 4.

When the first acquisition unit 110 acquires the fourth abnormality information, the second output unit 320 of the cloud server 300 outputs the second warning information to an output destination different from an output destination of the first warning information. That is, the second output unit 320 outputs the second warning information to a terminal apparatus 400 different from the terminal apparatus 400 to which the first warning information is output. When the first warning information is not output to the molding management server 100 or the injection molding machine 200, the second output unit 320 may output the second warning information thereto. The output of the second warning information by the second output unit 320 corresponds to step S155 in the abnormality notification processing shown in FIG. 4. A reason why the second warning information is output when the first acquisition unit 110 acquires the fourth abnormality information is that it is determined that the same abnormality determination information is not generated in the predetermined period when the second period is used as the predetermined period in step S130 in the abnormality notification processing.

According to the molding management system 10 in the first embodiment described above, even when the abnormality determination information is generated in the abnormality notification processing, when it is determined that the abnormality determination information including the same identification information of the injection molding machine 200 and the same type name of the measurement value is generated in the predetermined period, the warning information is not output, and the information indicating that the abnormality occurs in the injection molding machine 200 is not notified to the user. When it is determined that the abnormality determination information including the same identification information of the injection molding machine 200 and the same type name of the measurement value is not generated in the predetermined period, the warning information is output, and the information indicating that the abnormality occurs in the injection molding machine 200 is notified to the user. When the second abnormality information is acquired after the first abnormality information is acquired and before the first period elapses from the time point when the first abnormality information is acquired, the first warning information is not output. As described above, in the present embodiment, the warning information is not notified to the user each time the abnormality determination information including the same identification information of the injection molding machine 200 and the same type name of the measurement value is acquired. Therefore, since information indicating that an abnormality of a specific type occurs in a specific injection molding machine 200 is not notified to the user several times, when information indicating that an abnormality of another type occurs in the specific injection molding machine 200 or information indicating that an abnormality occurs in another injection molding machine 200 is notified to the user, a possibility that the user overlooks such information can be reduced.

In the present embodiment, the warning information is notified to the user at a time point when an abnormality of a specific type occurs first in a specific injection molding machine 200. Therefore, as compared with a case where the warning information is notified to the user at a time point when the abnormality of the specific type occurs a plurality of times in the specific injection molding machine 200, the user can quickly notice that the abnormality occurs in the injection molding machine 200.

In the present embodiment, when the fourth abnormality information is acquired, the second warning information is output to the output destination different from the output destination of the first warning information. Therefore, even when the user notified of the first warning information overlooks the first warning information, since the second warning information is notified to another user, the user can easily notice that the abnormality occurs in the injection molding machine 200. Since the second period is longer than the first period, the second warning information is output after the third abnormality information is acquired and the first warning information is output. Therefore, a frequency of the notification of the second warning information is lower than a frequency of the notification of the first warning information. Therefore, the warning information can be notified to the users at different frequencies. For example, when the first warning information is notified to a manager of the injection molding machine 200 and the second warning information is notified to a manager of a factory including the injection molding machine 200, the warning information is notified to the manager of the factory at a lower frequency than to the manager of the injection molding machine 200.

B. Second Embodiment

Figure 7:
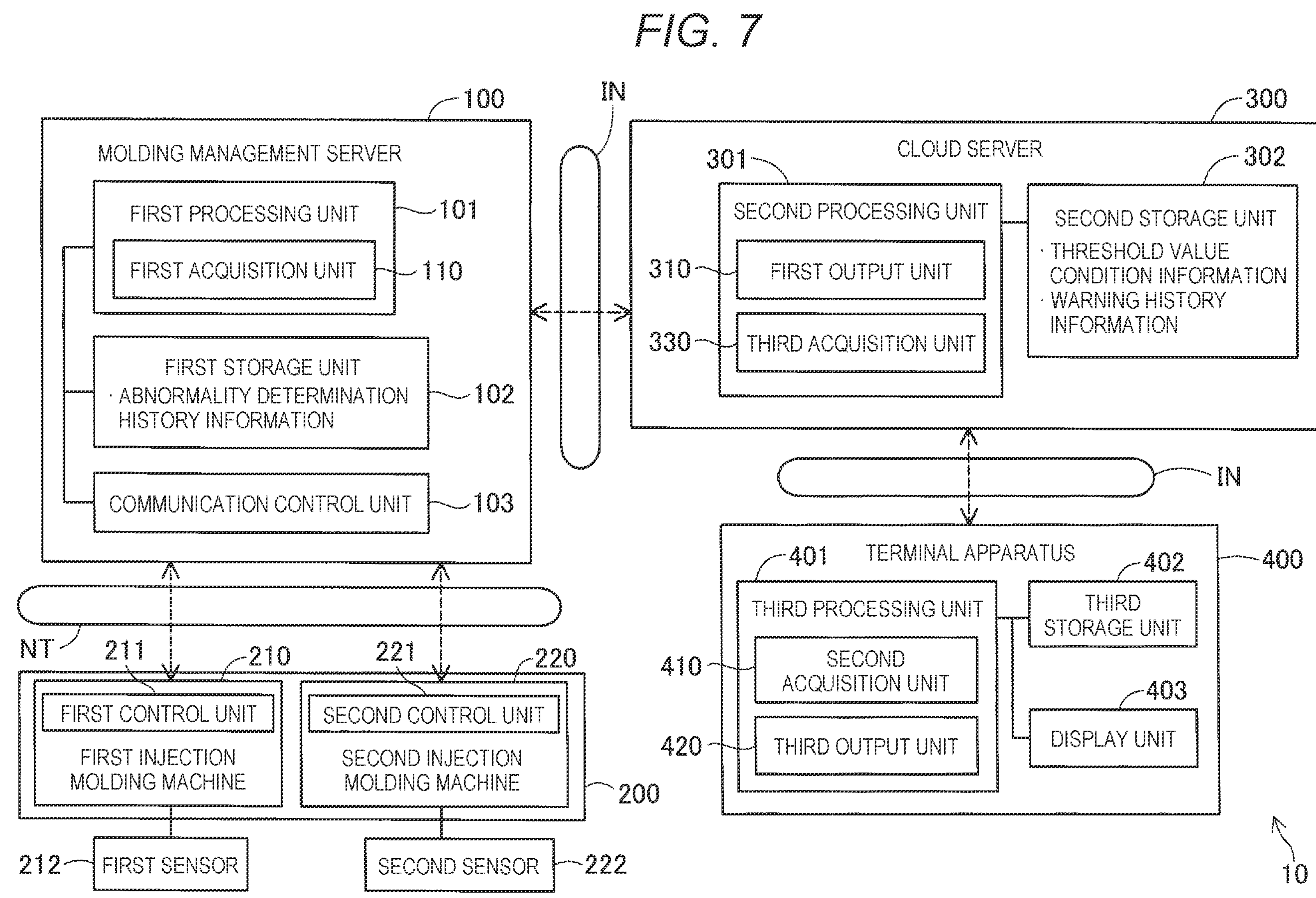
FIG. 7 is an explanatory diagram showing a schematic configuration of a molding management system in a second embodiment.

FIG. 7 explanatory diagram showing a schematic configuration of the molding management system 10 in a second embodiment. In the first embodiment, the second processing unit 301 of the cloud server 300 includes the first output unit 310 and the second output unit 320. In contrast, in the second embodiment, the second processing unit 301 of the cloud server 300 includes the first output unit 310 and a third acquisition unit 330. In the second embodiment, the terminal apparatus 400 is implemented as a computer including a third processing unit 401, a third storage unit 402, and the display unit 403. The configuration of each unit of the molding management system 10 other than the cloud server 300 and the terminal apparatus 400 is the same as that in the first embodiment. In the second embodiment, second warning information output processing is not performed. Hereinafter, the molding management server 100, the injection molding machine 200, and the terminal apparatus 400 are collectively referred to as an apparatus.

The third acquisition unit 330 of the cloud server 300 is implemented by the second processing unit 301 executing a program stored in the second storage unit 302. Alternatively, the third acquisition unit 330 may be implemented by a circuit.

The third acquisition unit 330 acquires abnormality resolution information. The abnormality resolution information will be described later.

The third processing unit 401 of the terminal apparatus 400 includes one or more processors and a main storage apparatus. The third storage unit 402 is implemented by an auxiliary storage apparatus such as a hard disk drive. Various screens are displayed on the display unit 403. As the terminal apparatus 400, for example, a tablet terminal, a notebook PC, a smartphone, or a handy terminal can be applied. The display unit 403 may have a touch panel function.

The third processing unit 401 includes a second acquisition unit 410 and a third output unit 420. The second acquisition unit 410 and the third output unit 420 are implemented by the third processing unit 401 executing a program. The second acquisition unit 410 and the third output unit 420 may be provided in the molding management server 100 or the injection molding machine 200.

The second acquisition unit 410 acquires the warning information.

The third output unit 420 outputs the abnormality resolution information.

In the second embodiment, in the abnormality notification processing shown in FIG. 4, a warning information notification screen SC3 is displayed on the display unit 403 in step S160.

Figure 8:
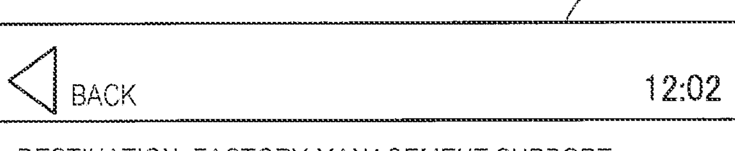
FIG. 8 shows an example of a warning information notification screen SC3.

FIG. 8 shows an example of the warning information notification screen SC3. In the example shown in FIG. 8, contents of the e-mail transmitted from the cloud server 300 to the terminal apparatus 400 are displayed on the warning information notification screen SC3. The warning information notification screen displays SC3 the identification information of the injection molding machine 200 and the type name of the measurement value in the warning information output in step S155 in the abnormality notification processing. The warning information notification screen SC3 is provided with an abnormality resolution button BT2.

Figure 9:
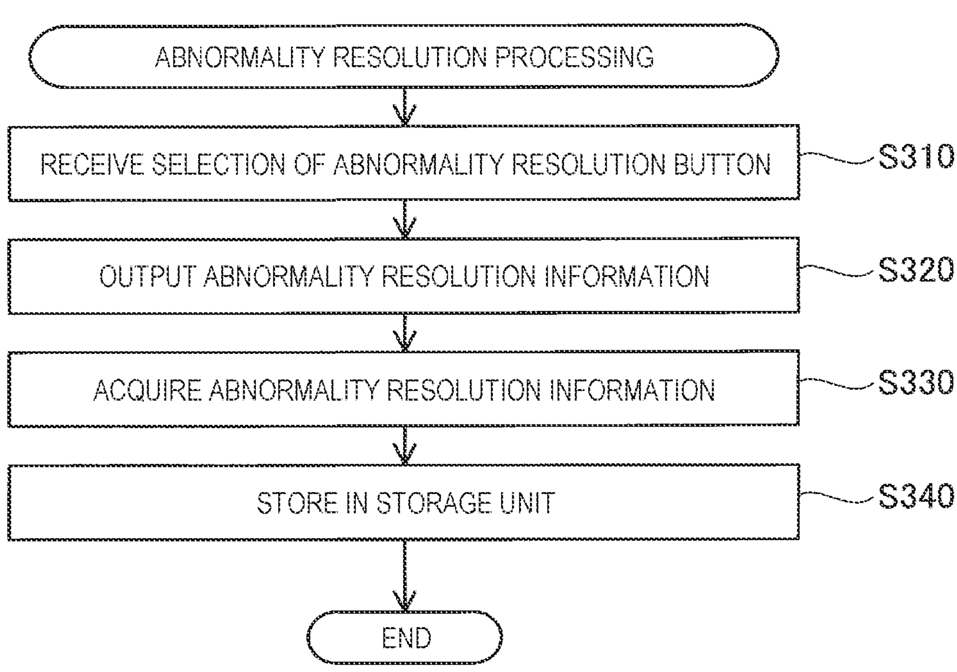
FIG. 9 is a flowchart of abnormality resolution processing.

FIG. 9 is a flowchart of abnormality resolution processing performed by the molding management system 10. The abnormality resolution processing is processing of storing, in the storage unit, information indicating that the abnormality occurring in the injection molding machine 200 is resolved. The abnormality resolution processing is performed by the user performing a predetermined operation on the molding management system 10 after the abnormality in the injection molding machine 200 displayed on the warning information notification screen SC3 is resolved in step S160 in the abnormality notification processing shown in FIG. 4.

In step S310, the terminal apparatus 400 receives selection of the abnormality resolution button BT2 on the warning information notification screen SC3 shown in FIG. 8. In step S310, after resolving the abnormality in the injection molding machine 200 displayed on the warning information notification screen SC3, the user clicks the abnormality resolution button BT2. For example, a case will be described in which information indicating that an abnormality occurs in a pressure of a molding material filled in a mold in a specific injection molding machine 200 is displayed on the warning information notification screen SC3. When the pressure of the molding material filled in the mold in the injection molding machine 200 displayed on the warning information notification screen SC3 exceeds the upper limit value of the threshold value, the user takes a measure such as increasing a set value of a temperature of a melting unit and decreasing a set value of an injection pressure of an injection unit, confirms that the pressure of the molding material filled in the mold does not exceed the upper limit value of the threshold value, and then clicks the abnormality resolution button BT2. When the pressure of the molding material filled in the mold in the injection molding machine 200 displayed on the warning information notification screen SC3 is lower than the lower limit value of the threshold value, the user takes a measure such as decreasing the set value of the temperature of the melting unit and increasing the set value of the injection pressure of the injection unit, confirms that the pressure of the molding material filled in the mold is not lower than the lower limit value of the threshold value, and then clicks the abnormality resolution button BT2.

In step S320, the third output unit 420 of the terminal apparatus 400 outputs the abnormality resolution information to the cloud server 300. The abnormality resolution information is information indicating that the abnormality in the injection molding machine 200 displayed on the warning information notification screen SC3 on which the abnormality resolution button BT2 is clicked is resolved. In the example described above, the abnormality resolution information is information indicating that the abnormality in the pressure of the molding material filled in the mold of the injection molding machine 200 displayed on the warning information notification screen SC3 is resolved. The abnormality resolution information output in step S320 includes an abnormality determination history ID of the warning information displayed on the warning information notification screen SC3 on which the abnormality resolution button BT2 is clicked in step S310.

In step S330, the third acquisition unit 330 of the cloud server 300 acquires the abnormality resolution information output in step S320.

In step S340, the second processing unit 301 of the cloud server 300 updates a record of warning history information corresponding to the abnormality resolution information acquired in step S330. The second processing unit 301 adds, to the record of the abnormality determination history information including the abnormality-determination-related code matching the abnormality determination history ID in the abnormality resolution information acquired in step S330, date-and-time when the third acquisition unit 330 acquires the abnormality resolution information and identification information of the terminal apparatus 400 that transmits the abnormality resolution information. The identification information of the terminal apparatus 400 is an ID number assigned to each terminal apparatus 400. That is, the second processing unit 301 stores the abnormality resolution information acquired in step S330 in the second storage unit 302 in association with the abnormality determination information associated with the abnormality determination history ID in the abnormality resolution information.

When the third acquisition unit 330 acquires the abnormality resolution information having the same contents transmitted from a plurality of terminal apparatuses 400 in step S330, the second processing unit 301 performs the following processing in step S340. The second processing unit 301 adds, to the record of the abnormality determination history information including the abnormality-determination-related code matching the abnormality determination history ID in the abnormality resolution information acquired in step S330, date-and-time when the third acquisition unit 330 first acquires the abnormality resolution information and the identification information of the terminal apparatus 400 that transmits the abnormality resolution information first acquired by the third acquisition unit 330. As described above, the abnormality resolution processing is performed.

Figure 10:
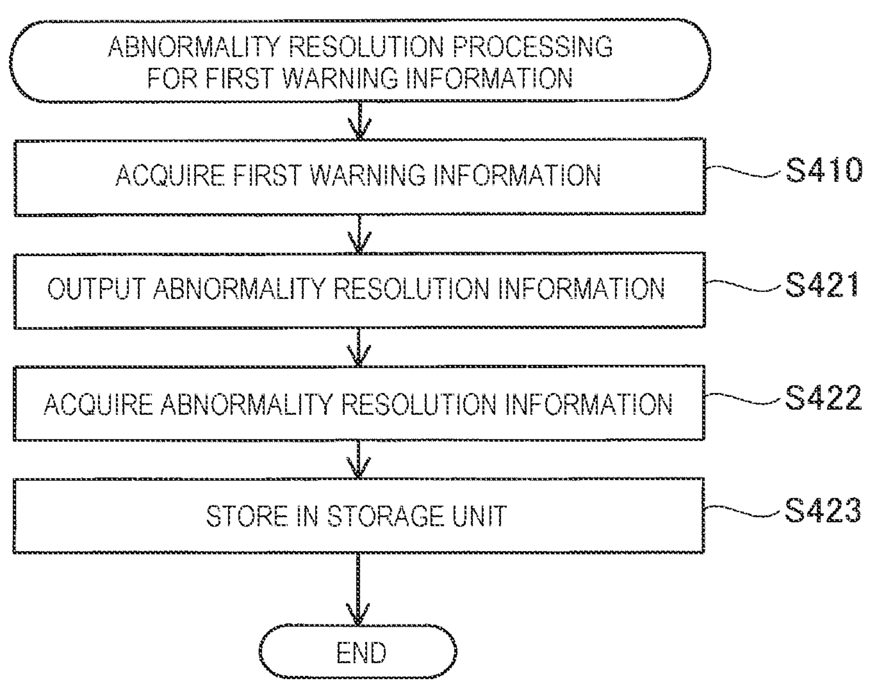
FIG. 10 is a flowchart of abnormality resolution processing for first warning information.

FIG. 10 is a flowchart of abnormality resolution processing for the first warning information, which is processing of storing, in the storage unit, information indicating that the abnormality in the injection molding machine 200 in the first warning information is resolved.

In step S410, the second acquisition unit 410 acquires the first warning information output at the time T1 or the first warning information output at the time T3 in the time chart shown in FIG. 6.

In step S421, the third output unit 420 outputs the abnormality resolution information on the injection molding machine 200 and the type of the abnormality in the first warning information output at the time T1 or the time T3.

Step S421 corresponds to step S320 in the abnormality resolution processing shown in FIG. 9.

In step S422, the third acquisition unit 330 acquires the abnormality resolution information output in step S421. Step S422 corresponds to step S330 in the abnormality resolution processing shown in FIG. 9.

In step S423, the second processing unit 301 stores in the second storage unit 302, in association with the abnormality resolution information acquired in step S422, at least one of the first abnormality information acquired at the time T1, the second abnormality information acquired at the time T2, and the third abnormality information acquired at the time T3 in the time chart shown in FIG. 6. Step S423 corresponds to step S340 in the abnormality resolution processing shown in FIG. 9.

According to the molding management system 10 in the second embodiment described above, in the abnormality resolution processing, when the user clicks the abnormality resolution button BT2 provided on the warning information notification screen SC3, the abnormality resolution information on the warning information displayed on the warning information notification screen SC3 is stored in the second storage unit 302 in association with the abnormality determination information associated with the abnormality determination history ID in the abnormality resolution information. Therefore, when the user clicks the abnormality resolution button BT2 provided on the warning information notification screen SC3, information indicating that the abnormality in the injection molding machine 200 displayed on the warning information notification screen SC3 is resolved can be stored in the storage unit. In the abnormality resolution processing for the first warning information, at least one of the first abnormality information, the second abnormality information, and the third abnormality information is stored in the second storage unit 302 in association with the abnormality resolution information. Therefore, information indicating that the abnormality in the injection molding machine 200 in the first abnormality information, the second abnormality information, and the third abnormality information is resolved can be stored in the storage unit.

C. Third Embodiment

FIG. 11 is an explanatory diagram showing a schematic configuration of the molding management system 10 in a third embodiment. In the second embodiment, the second processing unit 301 of the cloud server 300 includes the first output unit 310 and the third acquisition unit 330. In contrast, in the third embodiment, the second processing unit 301 of the cloud server 300 includes the first output unit 310 and an input unit 340. In the second embodiment, the third processing unit 401 of the terminal apparatus 400 includes the second acquisition unit 410 and the third output unit 420. In contrast, in the third embodiment, the third processing unit 401 of the terminal apparatus 400 includes the second acquisition unit 410 and a fourth acquisition unit 430. The configuration of each unit of the molding management system 10 other than the cloud server 300 and the terminal apparatus 400 is the same as that in the second embodiment.

The input unit 340 of the cloud server 300 is implemented by the second processing unit 301 executing a program stored in the second storage unit 302. Alternatively, the input unit 340 may be implemented by a circuit.

The input unit 340 receives input of the abnormality resolution information to the apparatus.

The fourth acquisition unit 430 of the terminal apparatus 400 is implemented by the third processing unit 401 executing a program. Alternatively, the fourth acquisition unit 430 may be implemented by a circuit. The second acquisition unit 410, the fourth acquisition unit 430, and the display unit 403 may be provided in the molding management server 100 or the injection molding machine 200.

The fourth acquisition unit 430 acquires, from the storage unit, information on the threshold value of the operation data of the injection molding machine 200 in the first warning information acquired by the second acquisition unit 410.

Figure 12:
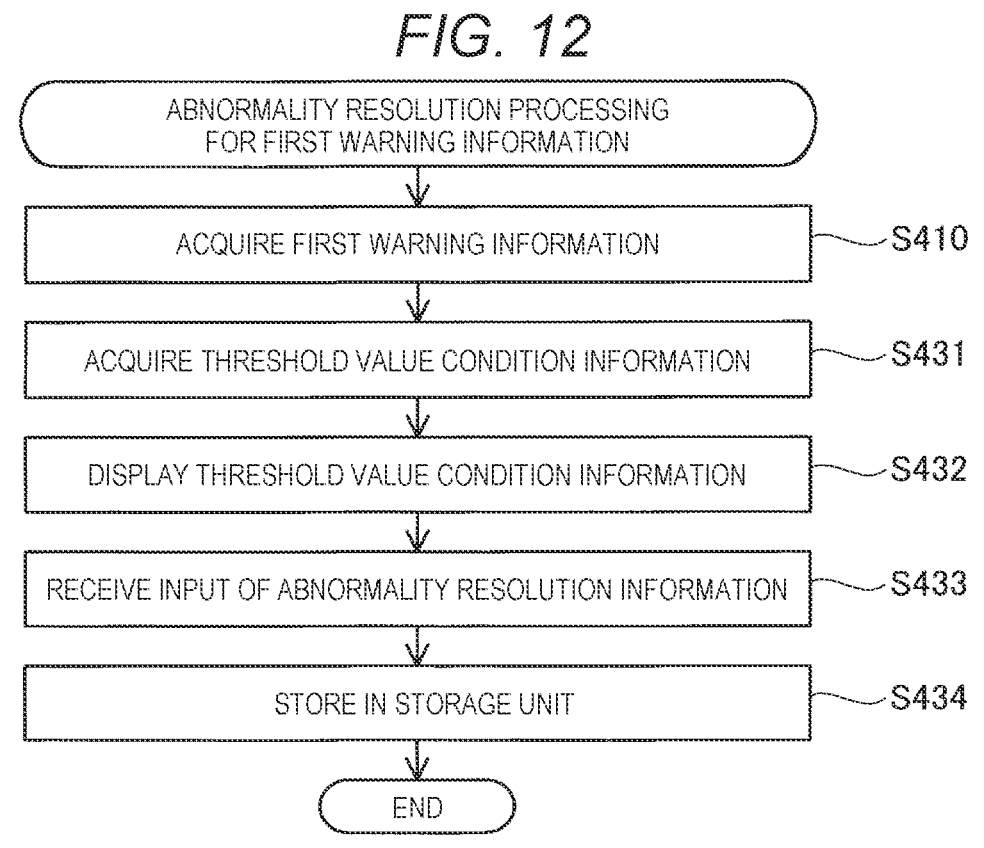

FIG. 12 is a flowchart of the abnormality resolution processing for the first warning information performed in the third embodiment. A portion where the same processing as the abnormality resolution processing for the first warning information in the second embodiment shown in FIG. 9 is performed is denoted by the same reference numeral, and a description thereof will be omitted.

In step S431, the fourth acquisition unit 430 of the terminal apparatus 400 acquires, from the second storage unit 302 of the cloud server 300, the threshold value condition information on the operation data of the injection molding machine 200 in the first warning information acquired in step S410.

In step S432, the third processing unit 401 of the terminal apparatus 400 displays, on the display unit 403, the first warning information acquired in step S410 and the threshold value condition information acquired in step S431.

Figure 13:
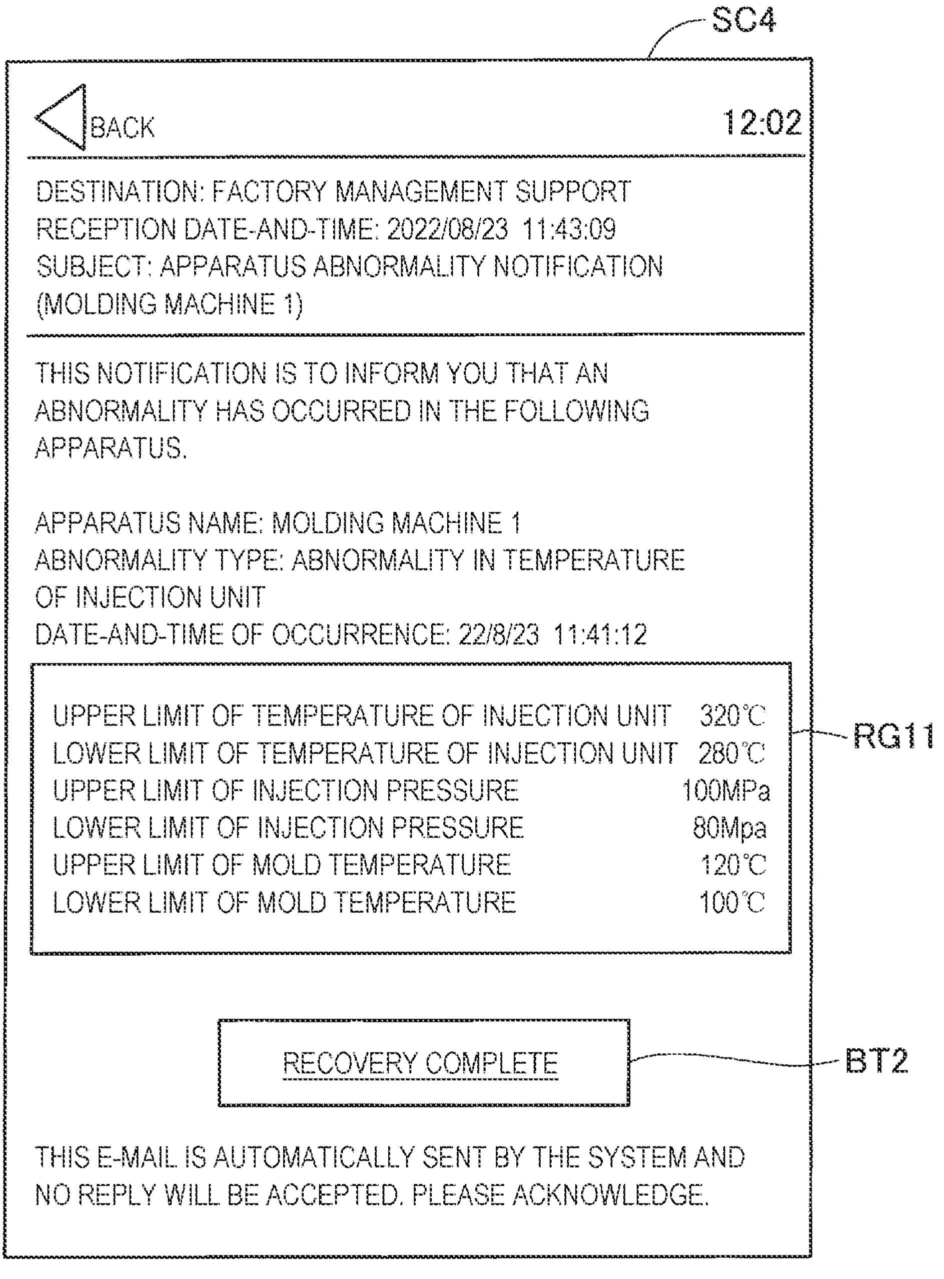
FIG. 13 shows an example of a warning information notification screen SC4.

FIG. 13 shows an example of a warning information notification screen SC4 displayed on the display unit 403 in step S432. In the example shown in FIG. 13, the contents of the e-mail transmitted from the cloud server 300 to the terminal apparatus 400 are displayed on the warning information notification screen SC4. The identification information of the injection molding machine 200 and the type name of the measurement value in the first warning information acquired in step S410 are displayed on the warning information notification screen SC4. The warning information notification screen SC4 is provided with a threshold value display area RG11 and the abnormality resolution button BT2. The threshold value display area RG11 displays the threshold value condition information acquired in step S431. In FIG. 13, the upper limit value of the threshold value and the lower limit value of the threshold value are displayed in the threshold value display area RG11 for each of the temperature of the injection unit, the injection pressure, and the temperature of the mold. In addition to the upper limit value of the threshold value and the lower limit value of the threshold value, the measurement value may be displayed on the warning information notification screen SC4. For example, when the measurement value of the temperature of the injection unit is lower than the lower limit value of the threshold value, the user can predict disconnection of a heater. When the measurement value of the temperature of the injection unit exceeds the upper limit value, the user can predict overheating of resin.

In step S433 in the abnormality resolution processing for the first warning information shown in FIG. 12, the input unit 340 of the cloud server 300 receives input of the abnormality resolution information to the terminal apparatus 400. When the user clicks the abnormality resolution button BT2 displayed on the warning information notification screen SC4, the third processing unit 401 of the terminal apparatus 400 transmits the abnormality resolution information to the cloud server 300. The input unit 340 receives the input of the abnormality resolution information when the user clicks the abnormality resolution button BT2 displayed on the warning information notification screen SC4. Step S433 corresponds to steps S310 and S320 in the abnormality resolution processing shown in FIG. 9.

In step S434, the second processing unit 301 of the cloud server 300 stores in the second storage unit 302, in association with the abnormality resolution information received in step S433, at least one of the first abnormality information acquired at the time T1, the second abnormality information acquired at the time T2, and the third abnormality information acquired at the time T3 in the time chart shown in FIG. 6. Step S440 corresponds to step S340 in the abnormality resolution processing shown in FIG. 9.

According to the molding management system 10 in the third embodiment described above, in the abnormality resolution processing for the first warning information, when the user clicks the abnormality resolution button BT2 provided on the warning information notification screen SC4, at least one of the first abnormality information, the second abnormality information, and the third abnormality information and the abnormality resolution information on the abnormality in the injection molding machine 200 displayed on the warning information notification screen SC4 are stored in the second storage unit 302 in association with each other. Therefore, when the user clicks the abnormality resolution button BT2 provided on the warning information notification screen SC4, information indicating that the abnormality in the injection molding machine 200 displayed on the warning information notification screen SC4 is resolved can be stored in the storage unit. Since the threshold value condition information on the injection molding machine 200 in the first warning information is displayed on the warning information notification screen SC4, the user can resolve the abnormality occurring in the injection molding machine 200 in the first warning information while checking the threshold value of the operation data of the injection molding machine 200.

D. Fourth Embodiment

A configuration of the molding management system 10 in the fourth embodiment is the same as that in the third embodiment.

Figure 14:
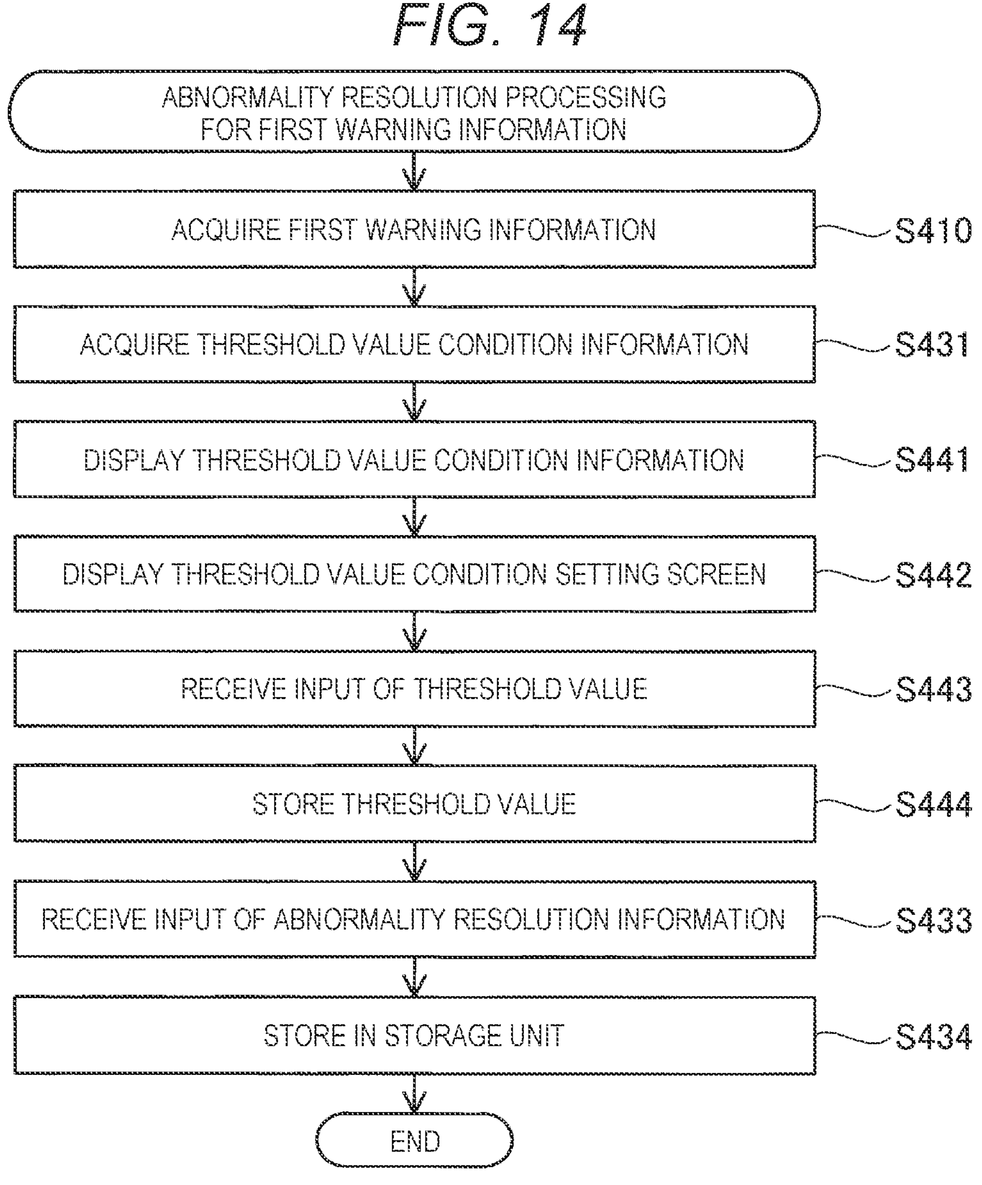
FIG. 14 is a flowchart of abnormality resolution processing for first warning information performed in a fourth embodiment.

FIG. 14 is a flowchart of abnormality resolution processing for the first warning information performed in the fourth embodiment. A portion where the same processing as the abnormality resolution processing for the first v information in the third embodiment shown in FIG. 12 is performed is denoted by the same reference numeral, and a description thereof will be omitted.

In step S441, the third processing unit 401 of the terminal apparatus 400 displays, on the display unit 403, the first warning information acquired in step S410 and the threshold value condition information acquired in step S431.

Figure 15:
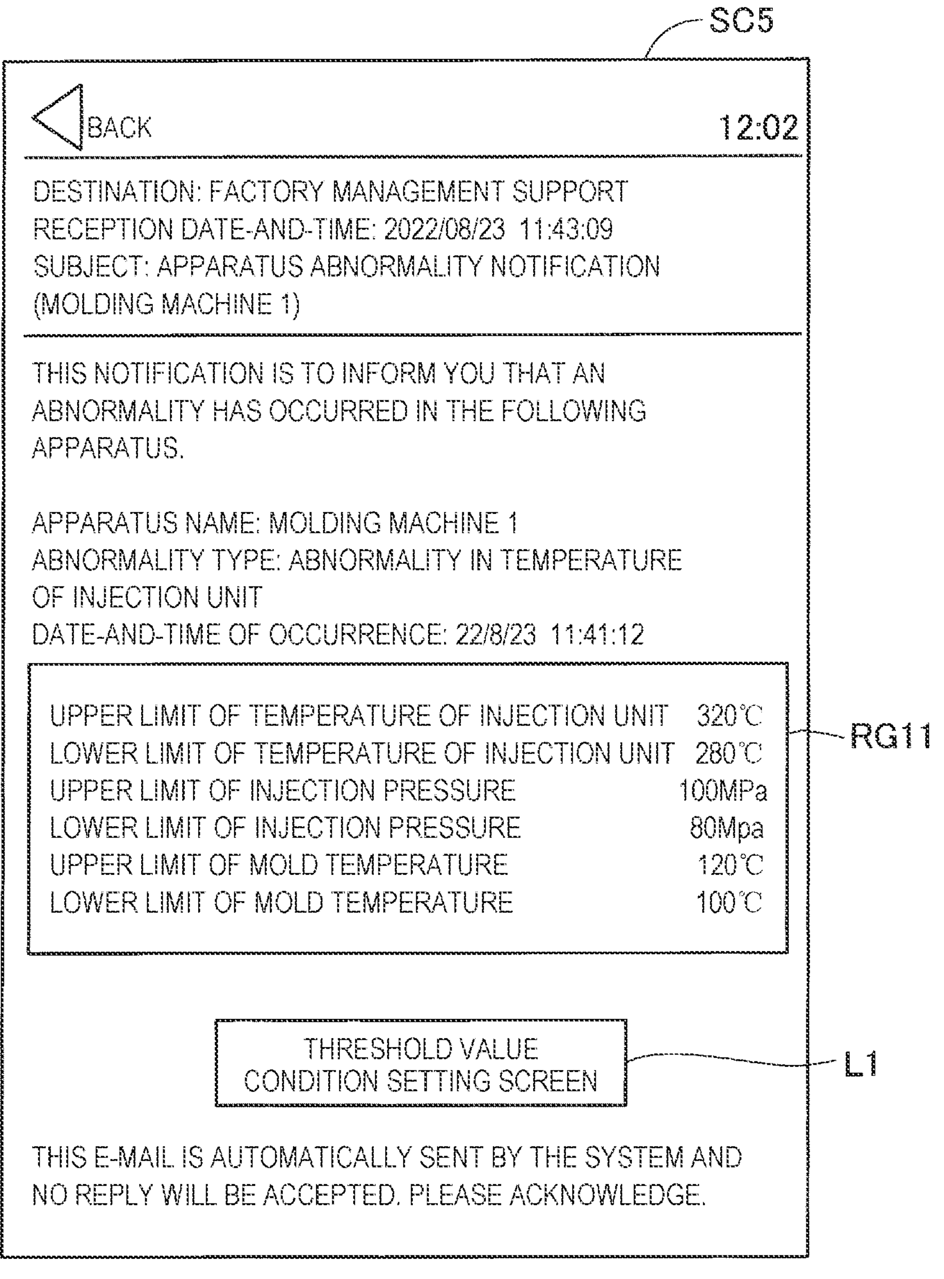
FIG. 15 shows an example of a warning information notification screen SC5.

FIG. 15 shows an example of a warning information notification screen SC5 displayed on the display unit 403 in step S441. In the example shown in FIG. 15, the contents of the e-mail transmitted from the cloud server 300 to the terminal apparatus 400 are displayed on the warning information notification screen SC5. The identification information of the injection molding machine 200 and the type name of the measurement value in the first warning information acquired in step S410 are displayed on the warning information notification screen SC5. The warning information notification screen SC5 is provided with the threshold value display area RG11. A link L1 to a threshold value condition setting screen SC6 is also displayed on the warning information notification screen SC5.

In step S442 in FIG. 14, when the user clicks the link L1 displayed on the warning information notification screen SC5, the third processing unit 401 displays the threshold value condition setting screen SC6 on the display unit 403.

Figure 16:
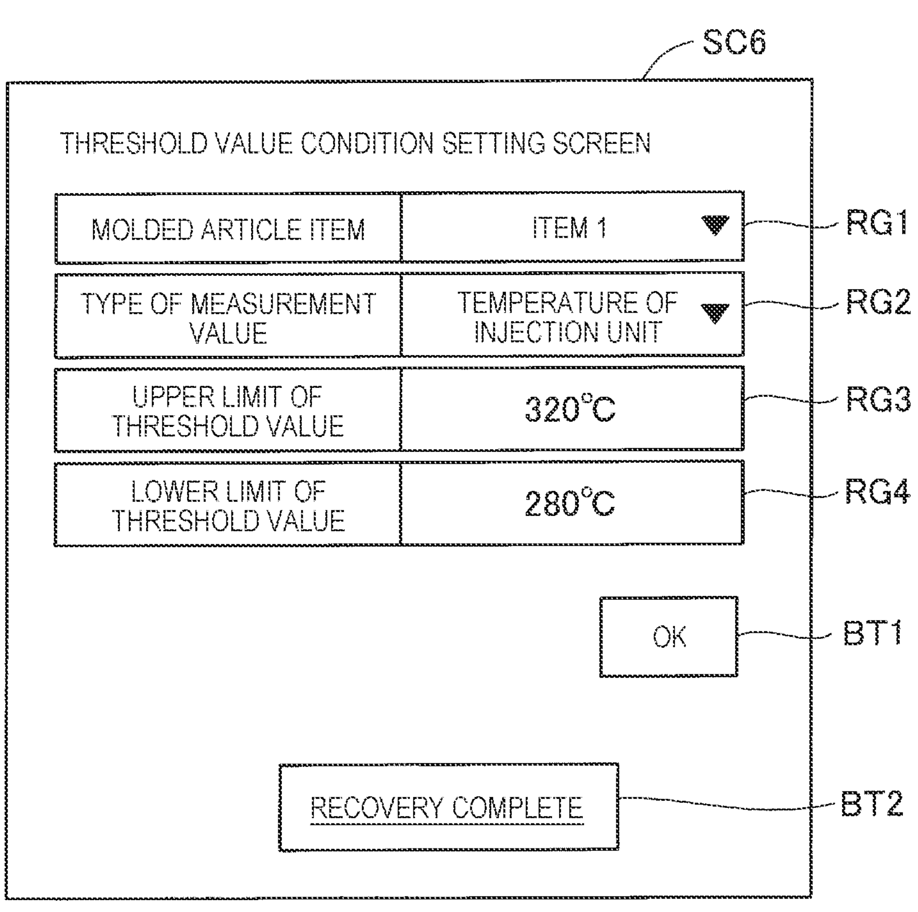
FIG. 16 shows a threshold value condition setting screen.

FIG. 16 shows the threshold value condition setting screen SC6. The threshold value condition setting screen SC6 is a screen on which information on the threshold value of the operation data of the injection molding machine 200 can be updated. The threshold value condition setting screen SC6 is provided with the display area RG1 where the item name of the molded article is displayed, the display area RG2 where the type name of the measurement value is displayed, the display area RG3 where the upper limit value of the threshold value is displayed, the display area RG4 where the lower limit value of the threshold value is displayed, the OK button BT1, and the abnormality resolution button BT2. The threshold value condition setting screen SC6 may also display the measurement value of the operation data of the injection molding machine 200.

In step S443 in FIG. 14, the second processing unit 301 of the cloud server 300 receives input of information from the display area RG1 to the display area RG4 on the threshold value condition setting screen SC6. On the threshold value condition setting screen SC6 displayed on the display unit 403 of the terminal apparatus 400, the user selects, in the display area RG1, an item of the molded article molded by the injection molding machine 200 in the first warning information, and selects, in the display area RG2, the type name of the measurement value in the first warning information. In the display area RG3 and the display area RG4, the user changes the upper limit value of the threshold value and the lower limit value of the threshold value corresponding to a type of the measurement value of the item selected in the display area RG1 and the display area RG2, and clicks the OK button BT1. The user may not change the upper limit value of the threshold value or the lower limit value of the threshold value. For example, in a case where the first warning information is output, when it is determined that the molded article molded by the injection molding machine 200 in the first warning information, that is, a molded article molded in a state where the operation data exceeds the threshold value, is not a defective article in an inspection, the user changes the threshold value of the operation data of the type name of the measurement value in the first warning information.

In step S444 in FIG. 14, the second processing unit 301 of the cloud server 300 stores, in the second storage unit 302, the item name of the molded article selected in the display area RG1 on the threshold value condition setting screen SC6, the type name of the measurement value selected in the display area RG2, the upper limit value of the threshold value input into the display area RG3, and the lower limit value of the threshold value input into the display area RG4 in association with each other.

In step S433, the input unit 340 of the cloud server 300 receives the input of the abnormality resolution information to the terminal apparatus 400. When the user clicks the abnormality resolution button BT2 displayed on the threshold value condition setting screen SC6, the third processing unit 401 of the terminal apparatus 400 transmits the abnormality resolution information to the cloud server 300. The input unit 340 receives the input of the abnormality resolution information when the user clicks the abnormality resolution button BT2 displayed on the threshold value condition setting screen SC6. That is, on the threshold value condition setting screen SC6, it is possible to input the abnormality resolution information on the injection molding machine 200 and the type of the abnormality in the first warning information.

According to the molding management system 10 in the fourth embodiment described above, the warning information notification screen SC5 is provided with the link L1 to the threshold value condition setting screen SC6. On the threshold value condition setting screen SC6, it is possible to update the information on the threshold value of the operation data of the injection molding machine 200. The threshold value condition setting screen SC6 is provided with the abnormality resolution button BT2. Therefore, in the threshold value condition setting screen SC6, when the user updates the threshold value of the operation data of the injection molding machine 200 and clicks the abnormality resolution button BT2, information indicating that the abnormality in the injection molding machine 200 displayed on the warning information notification screen SC5 is resolved can be stored in the storage unit.

E. Fifth Embodiment

FIG. 17 is an explanatory diagram showing a schematic configuration of the molding management system 10 in a fifth embodiment. In the fifth embodiment, the molding management system 10 further includes an extraction apparatus 510, a mold temperature adjustment apparatus 520, a drying apparatus 530, a material supply apparatus 540, and an inspection apparatus 550. The extraction apparatus 510, the mold temperature adjustment apparatus 520, the drying apparatus 530, the material supply apparatus 540, and the inspection are collectively referred to as peripheral equipment 500. The peripheral equipment 500 is coupled to the injection molding machine 200. The peripheral equipment 500 may be communicable with the molding management server 100 via the network NT. FIG. 17 shows an example in which the molding management system 10 includes one injection molding machine 200, and the molding management system 10 may include a plurality of injection molding machines 200. The molding management system 10 may include a plurality of pieces of each type of the peripheral equipment 500.

The extraction apparatus 510 is an apparatus that extracts the molded article whose molding is completed from the mold of the injection molding machine 200. The mold temperature adjustment apparatus 520 is an apparatus that adjusts the temperature of the mold mounted on the injection molding machine 200. The drying apparatus 530 is an apparatus that dries the material used in the injection molding machine 200. The material supply apparatus 540 is an apparatus that supplies the material to the injection molding machine 200. The inspection apparatus 550 is an apparatus that inspects the molded article molded by the injection molding machine 200. The molding management system 10 may include at least one piece of the peripheral equipment 500 described above.

When an abnormality occurs in the peripheral equipment 500, the peripheral equipment 500 transmits peripheral equipment abnormality information, which is information on the abnormality occurring in the peripheral equipment 500, to the molding management server 100 via the first control unit 211 of the injection molding machine 200. The peripheral equipment abnormality information includes identification information of the injection molding machine 200 coupled to the peripheral equipment 500 where the abnormality occurs, identification information of the peripheral equipment 500 where the abnormality occurs, and a type name of the abnormality occurring in the peripheral equipment 500.

The identification information of the peripheral equipment 500 is a name of the peripheral equipment 500, an ID number assigned to each piece of peripheral equipment 500, or the like. When the peripheral equipment 500 is the extraction apparatus 510, the type name of the abnormality occurring in the peripheral equipment 500 is a failure in extraction of the molded article, an operation failure, or the like. When the peripheral equipment 500 is the mold temperature adjustment apparatus 520, the type name of the abnormality occurring in the peripheral equipment 500 is inability to adjust the temperature of the mold, an operation failure, or the like. When the peripheral equipment 500 is the drying apparatus 530, the type name of the abnormality occurring in the peripheral equipment 500 is absence of the material in the apparatus, an operation failure, or the like. When the peripheral equipment 500 is the material supply apparatus 540, the type name of the abnormality occurring in the peripheral equipment 500 is absence of the material in the apparatus, clogging of the material, an operation failure, or the like. When the peripheral equipment 500 is the inspection apparatus 550, the type name of the abnormality occurring in the peripheral equipment 500 is absence of the molded article in the apparatus, a determination that the molded article is a defective article, an operation failure, or the like. That is, the peripheral equipment abnormality information includes the identification information of the injection molding machine 200, which is information on the injection molding machine 200, the identification information of the peripheral equipment 500, which is information on the peripheral equipment 500 of the injection molding machine 200, and the type name of the abnormality occurring in the peripheral equipment 500, which is information on the abnormality occurring in the peripheral equipment 500 of the injection molding machine 200.

In the first embodiment, the first processing unit 101 of the molding management server 100 includes the first acquisition unit 110. In contrast, in the fifth embodiment, the first processing unit 101 includes the first acquisition unit 110 and a fifth acquisition unit 120. In the first embodiment, the second processing unit 301 of the cloud server 300 includes the first output unit 310 and the second output unit 320. In contrast, in the fifth embodiment, the second processing unit 301 includes the first output unit 310 and a fourth output unit 350. The configurations of the injection molding machine 200, the sensor, and the terminal apparatus 400 are the same as those in the first embodiment. In the fifth embodiment, the second warning information output processing is not performed.

The fifth acquisition unit 120 is implemented by the first processing unit 101 executing a program stored in the first storage unit 102. Alternatively, the fifth acquisition unit 120 may be implemented by a circuit.

The fifth acquisition unit 120 acquires the peripheral equipment abnormality information.

The fourth output unit 350 is implemented by the second processing unit 301 executing a program stored in the second storage unit 302. Alternatively, the fourth output unit 350 may be implemented by a circuit.

The fourth output unit 350 outputs third warning information. The third warning information is information notifying that an abnormality occurs in the peripheral equipment 500 of the injection molding machine 200.

Figure 18:
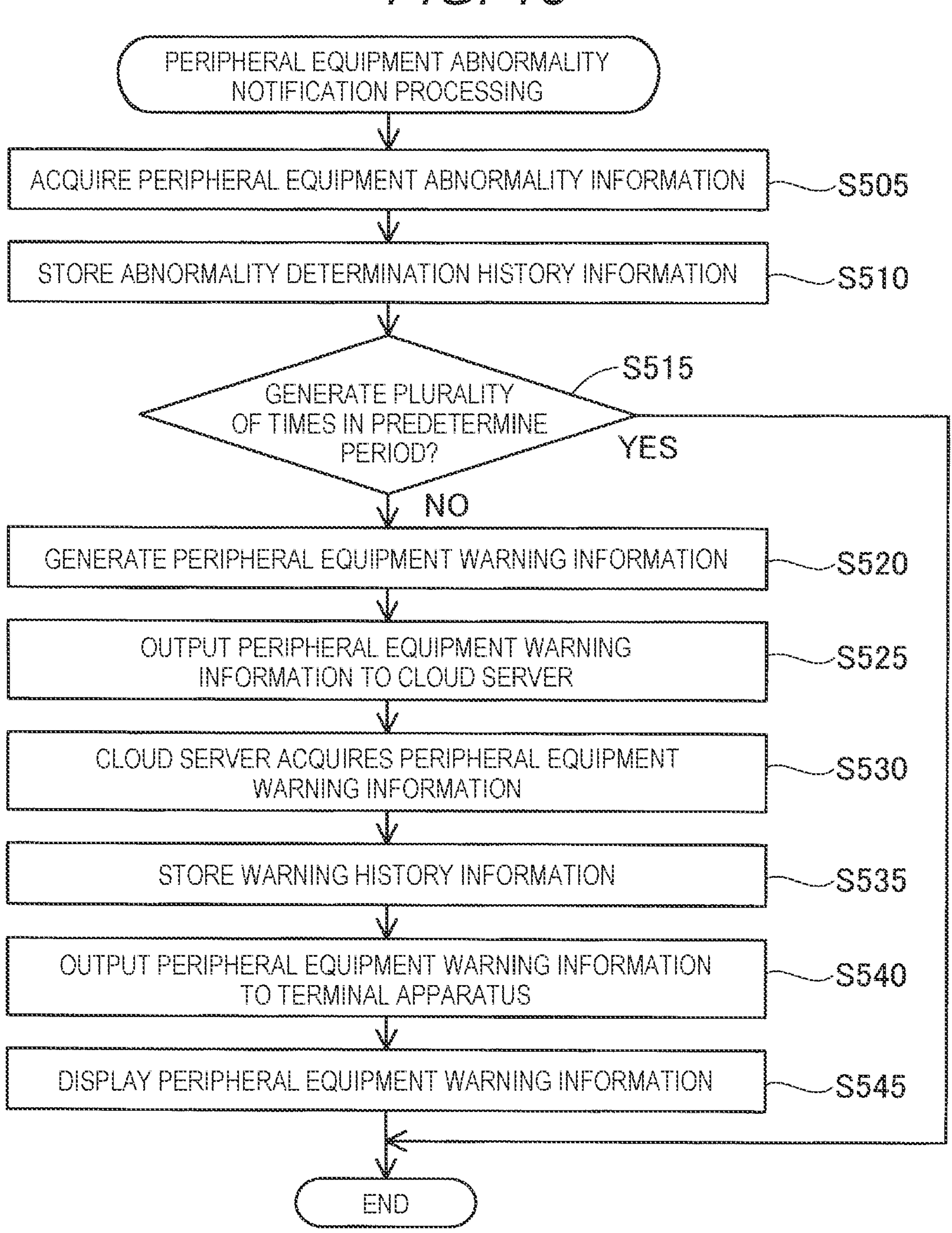
FIG. 18 is a flowchart of peripheral equipment abnormality notification processing.

FIG. 18 is a flowchart of peripheral equipment abnormality notification processing performed by the molding management system 10. The peripheral equipment abnormality notification processing is performed each time the peripheral equipment abnormality information is transmitted from the peripheral equipment 500.

In step S505, the first processing unit 101 acquires the peripheral equipment abnormality information transmitted from the injection molding machine 200.

In step S510, the first processing unit 101 stores, in the first storage unit 102, the abnormality determination history information including the peripheral equipment abnormality information acquired in step S505. In other words, the first processing unit 101 adds a record of the abnormality determination history information to the first storage unit 102.

The abnormality determination history information includes the peripheral equipment abnormality information, the abnormality determination history ID, and the abnormality-determination-related code. The abnormality determination history ID is an ID number assigned to each piece of peripheral equipment abnormality information.

The abnormality-determination-related code is an abnormality determination history ID of its own abnormality determination history or information an abnormality determination history ID of abnormality determination history information already stored in the first storage unit 102. First, an abnormality-determination-related code when the same peripheral equipment abnormality information is not acquired in a predetermined period will be described. The same peripheral equipment abnormality information is peripheral equipment abnormality information including the identification information of the injection molding machine 200, the identification information of the peripheral equipment 500, and the type name of the abnormality that match the identification information of the injection molding machine 200, the identification information of the peripheral equipment 500, and the type name of the abnormality in the peripheral equipment abnormality information acquired in step S505. The predetermined period is a period from a predetermined time point to a time point when the peripheral equipment abnormality information is acquired in step S505. In the above-described case, the abnormality-determination-related code of the abnormality determination history information stored in the first storage unit 102 in step S510 is the abnormality determination history ID of its own abnormality determination history information. Next, a case where the same peripheral equipment abnormality information is acquired in the predetermined period will be described. In this case, the abnormality-determination-related code of the abnormality determination history information stored in the first storage unit 102 in step S510 is the abnormality determination history ID of the abnormality determination history information including the same peripheral equipment abnormality information generated first within the predetermined period.

In step S515, the first processing unit 101 determines whether the same peripheral equipment abnormality information is acquired in the predetermined period. That is, the first processing unit 101 determines whether the abnormality determination history information including the same abnormality-determination-related code as the abnormality-determination-related code of the abnormality determination history information stored in the first storage unit 102 in step S510 is stored in the first storage unit 102.

When it is determined in step S515 that the same peripheral equipment abnormality information is not acquired in the predetermined period, the first processing unit 101 generates peripheral equipment warning information in step S520. The peripheral equipment warning information is information notifying that an abnormality occurs in the peripheral equipment 500. The peripheral equipment warning information includes the peripheral equipment abnormality information, the abnormality determination history ID, and the abnormality-determination-related code. The first processing unit 101 generates the peripheral equipment warning information including the peripheral equipment abnormality information, the abnormality determination history ID, and the abnormality-determination-related code in the abnormality determination history information stored in the first storage unit 102 in step S510. When it is determined in step S515 that the same peripheral equipment abnormality information is acquired in the predetermined period, the first processing unit 101 ends the peripheral equipment abnormality notification processing.

In step S525, the first processing unit 101 outputs the peripheral equipment warning information generated in step S520 to the cloud server 300.

In step S530, the second processing unit 301 of the cloud server 300 acquires the peripheral equipment warning information transmitted in step S525.

In step S535, the second processing unit 301 of the cloud server 300 stores, in the second storage unit 302, the peripheral equipment warning information acquired in step S530 as the warning history information. In other words, the second processing unit 301 adds a record of the warning history information to the second storage unit 302. The warning history information includes the peripheral equipment abnormality information, the abnormality determination history ID, and the abnormality-determination-related code. The warning history information may not include the abnormality-determination-related code.

In step S540, the second processing unit 301 outputs the peripheral equipment warning information acquired in step S530 to the terminal apparatus 400. At this time, the second processing unit 301 may output the peripheral equipment warning information excluding the abnormality-determination-related code to the terminal apparatus 400. The second processing unit 301 transmits the peripheral equipment warning information to the terminal apparatus 400 in a form such as an e-mail or a message. The second processing unit 301 may cause the terminal apparatus 400 to output a warning sound or may cause the terminal apparatus 400 to vibrate.

In step S545, the terminal apparatus 400 displays the peripheral equipment warning information output in step S540 on the display unit 403.

FIG. 19 shows an example of a peripheral equipment warning information notification screen SC7 displayed on the display unit 403 of the terminal apparatus 400 in step S545 in the peripheral equipment abnormality notification processing shown in FIG. 18. In the example shown in FIG. 19, contents of the e-mail transmitted from the cloud server 300 to the terminal apparatus 400 are displayed on the peripheral equipment warning information notification screen SC7. The peripheral equipment warning information notification screen SC7 displays the identification information of the peripheral equipment 500 and the type name of the abnormality in the peripheral equipment warning information output in step S540. As described above, the peripheral equipment abnormality notification processing is performed.

Hereinafter, processing performed by the molding management system 10 when a plurality of pieces of peripheral equipment abnormality information including the same identification information of the injection molding machine 200, the same identification information of the peripheral equipment 500, and the same type name of the abnormality are acquired at time intervals will be described.

Figure 20:
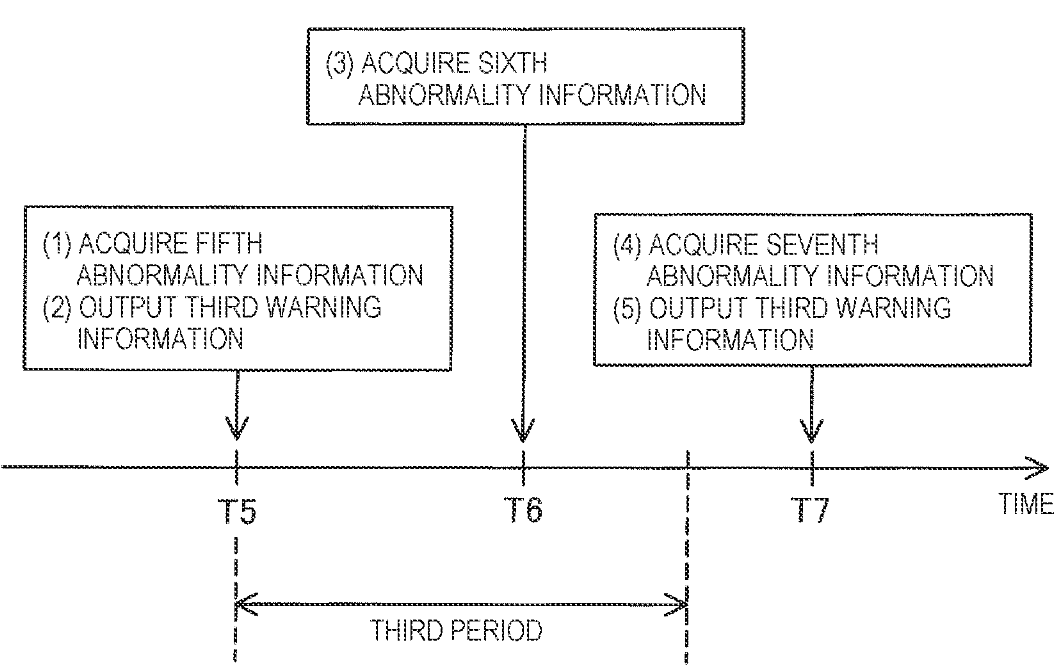
FIG. 20 is a time chart showing a timing when warning information is output.

FIG. 20 is a time chart showing a timing when the warning information is output. FIG. 20 shows a case where one piece of peripheral equipment abnormality information including the same identification information of the injection molding machine 200, the same identification information of the peripheral equipment 500, and the same type name of the abnormality is acquired after one piece of peripheral equipment abnormality information is acquired and before a third period elapses therefrom, and one piece of peripheral equipment abnormality information including the same identification information of the injection molding machine 200, the same identification information of the peripheral equipment 500, and the same type name of the abnormality is acquired after the third period elapses.

First, at time T5, the fifth acquisition unit 120 of the molding management server 100 acquires fifth abnormality information that is the peripheral equipment abnormality information. The acquisition of the fifth abnormality information by the fifth acquisition unit 120 corresponds to step S505 in the peripheral equipment abnormality notification processing shown in FIG. 18. It is assumed that the fifth acquisition unit 120 does not acquire any peripheral equipment abnormality information including the same identification information of the injection molding machine 200, the same identification information of the peripheral equipment 500, and the same type name of the abnormality during a period from a time point preceding the time T5 by the third period to the time T5.

When the fifth acquisition unit 120 acquires the fifth abnormality information, the fourth output unit 350 of the cloud server 300 outputs the third warning information to the terminal apparatus 400. The third warning information is peripheral equipment warning information including the fifth abnormality information. The output of the third warning information by the fourth output unit 350 corresponds to step S540 in the abnormality notification processing shown in FIG. 18. A reason why the third warning information is output when the fifth abnormality information is acquired is that it is determined that the same peripheral equipment abnormality information is not generated in the predetermined period when the third period is used as the predetermined period in step S515 in the peripheral equipment abnormality notification processing. The fourth output unit 350 may output the third warning information to the molding management server 100 or the injection molding machine 200.

At time T6, the fifth acquisition unit 120 acquires sixth abnormality information. The sixth abnormality information is peripheral equipment abnormality information including the identification information of the injection molding machine 200, the identification information of the peripheral equipment 500, and the type name of the abnormality in the fifth abnormality information. The time T6 is a time before the third period elapses from the time T5. That is, after acquiring the fifth abnormality information, the fifth acquisition unit 120 acquires the sixth abnormality information before the third period elapses from the time point when the fifth abnormality information is acquired. The acquisition of the sixth abnormality information by the fifth acquisition unit 120 corresponds to step S505 in the peripheral equipment abnormality notification processing shown in FIG. 18.

When the fifth acquisition unit 120 acquires the sixth abnormality information, the fourth output unit 350 of the cloud server 300 does not output the third warning information to the terminal apparatus 400. That is, step S540 in the peripheral equipment abnormality notification processing shown in FIG. 18 is not performed. A reason why the third warning information is not output when the fifth acquisition unit 120 acquires the sixth abnormality information is that it is determined that the same peripheral equipment abnormality information is generated in the predetermined period when the third period is used as the predetermined period in step S515 in the peripheral equipment abnormality notification processing.

At time T7, the fifth acquisition unit 120 acquires seventh abnormality information. The seventh abnormality information is peripheral equipment abnormality information including the identification information of the injection molding machine 200, the identification information of the peripheral equipment 500, and the type name of the abnormality in the fifth abnormality information. The time T7 is a time after the third period elapses from the time T5. That is, after acquiring the fifth abnormality information, the fifth acquisition unit 120 acquires the seventh abnormality information after the third period elapses from the time point when the fifth abnormality information is acquired. The acquisition of the seventh abnormality information by the fifth acquisition unit 120 corresponds to step S505 in the peripheral equipment abnormality notification processing shown in FIG. 18.

When the fifth acquisition unit 120 acquires the seventh abnormality information, the fourth output unit 350 of the cloud server 300 outputs the third warning information to the terminal apparatus 400. The output of the third warning information by the fourth output unit 350 corresponds to step S540 in the abnormality notification processing shown in FIG. 18. A reason why the third warning information is output when the seventh abnormality information is acquired is that it is determined that the same peripheral equipment abnormality information is not generated in the predetermined period when the third period is used as the predetermined period in step S515 in the peripheral equipment abnormality notification processing.

According to the molding management system 10 in the fifth embodiment described above, even when the peripheral equipment abnormality information is acquired in the peripheral equipment abnormality notification processing, when it is determined that peripheral equipment abnormality information including the same identification information of the injection molding machine 200, the same identification information of the peripheral equipment 500, and the same type name of the abnormality is acquired in the predetermined period, the peripheral equipment warning information is not output, and the information indicating that the abnormality occurs in the peripheral equipment 500 is not notified to the user. When it is determined that the peripheral equipment abnormality information including the same identification information of the injection molding machine 200, the same identification information of the peripheral equipment 500, and the same type name of the abnormality is not acquired in the predetermined period, the peripheral equipment warning information is output, and the information indicating that the abnormality occurs in the peripheral equipment 500 is notified to the user. When the sixth abnormality information is acquired after the fifth abnormality information is acquired and before the third period elapses from the time point when the fifth abnormality information is acquired, the third warning information is not output. Therefore, the peripheral equipment warning information is not notified to the user each time the peripheral equipment abnormality information including the same identification information of the injection molding machine

200, the same identification information of the peripheral equipment 500, and the same type name of the abnormality is acquired. Therefore, since information indicating that an abnormality of a specific type occurs in a specific piece of peripheral equipment 500 is not notified to the user several times, when information indicating that an abnormality of another type occurs in the specific piece of peripheral equipment 500 or information indicating that an abnormality occurs in another piece of peripheral equipment 500 is notified to the user, a possibility that the user overlooks such information can be reduced.

In the present embodiment, the peripheral equipment warning information is notified to the user at a time point when an abnormality of a specific type occurs first in a specific piece of peripheral equipment 500. Therefore, as compared with a case where the peripheral equipment warning information is notified to the user at a time point when the abnormality of the specific type occurs a plurality of times in the specific piece of peripheral equipment 500, the user can quickly notice that the abnormality occurs in the peripheral equipment 500.

F. Sixth Embodiment

FIG. 21 is an explanatory diagram showing a schematic configuration of the molding management system 10 in a sixth embodiment. In the first embodiment, the molding management server 100 generates the abnormality determination information. In contrast, in the sixth embodiment, the injection molding machine 200 generates the abnormality determination information based on the operation data of the injection molding machine 200 and the information on the threshold value of the operation data.

In the first embodiment, the first processing unit 101 of the molding management system 10 includes the first acquisition unit 110. In contrast, in the sixth embodiment, the first processing unit 101 further includes a sixth acquisition unit 130. In the first embodiment, the second processing unit 301 of the cloud server 300 includes the first output unit 310 and the second output unit 320. In contrast, in the sixth embodiment, the second processing unit 301 includes the first output unit 310. The configuration of each unit of the molding management system 10 other than the injection molding machine 200, the molding management server 100, and the cloud server is the same as that in the first embodiment. In the sixth embodiment, the second warning information output processing is not performed.

The sixth acquisition unit 130 is implemented by the first processing unit 101 executing a program stored in the first storage unit 102. Alternatively, the sixth acquisition unit 130 may be implemented by a circuit.

The sixth acquisition unit 130 acquires the operation data from the injection molding machine 200.

Figure 22:
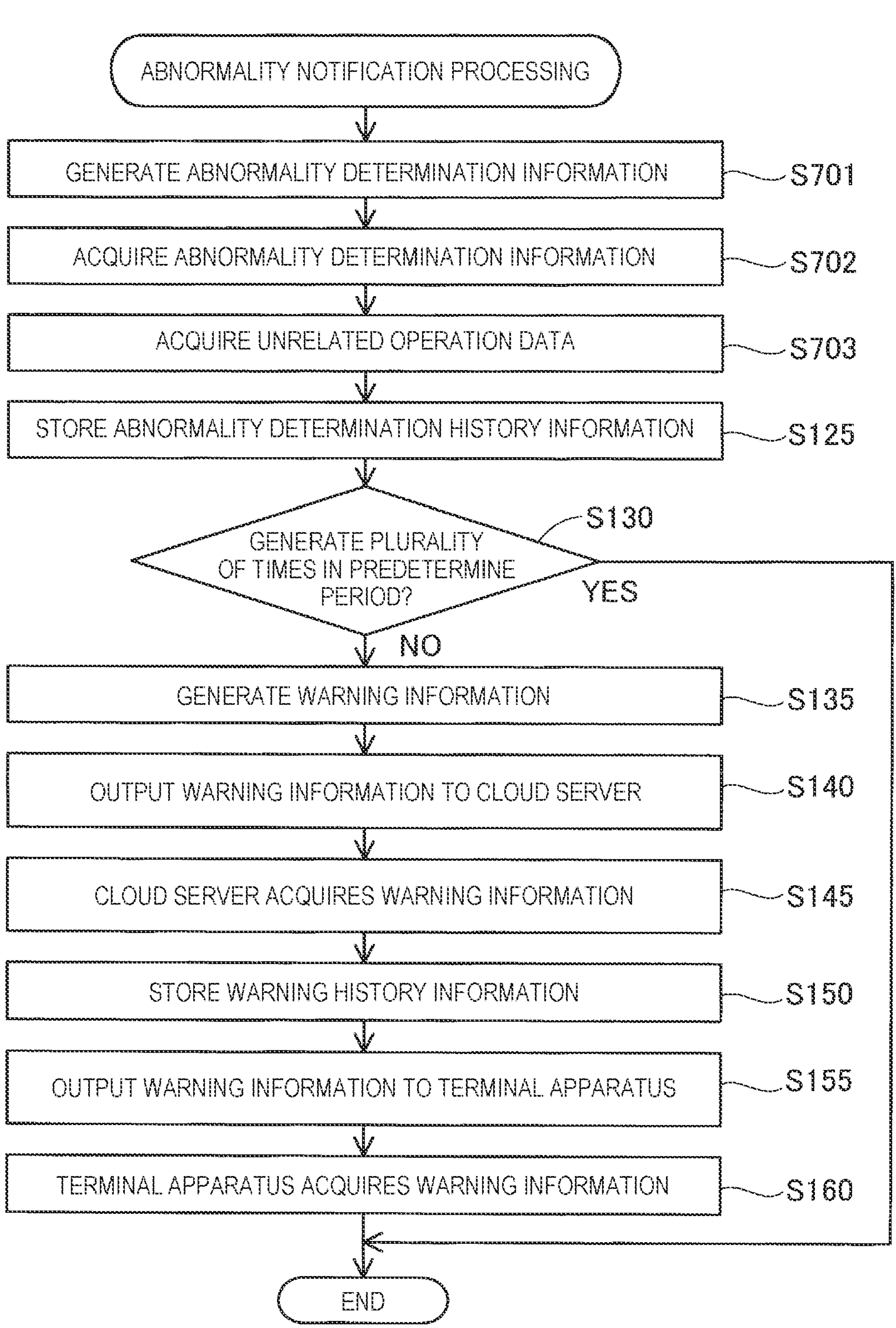
FIG. 22 is a flowchart of abnormality notification processing performed in the sixth embodiment.

FIG. 22 is a flowchart of the abnormality notification processing performed in the sixth embodiment. In the sixth embodiment, the abnormality notification processing is performed each time the abnormality determination information is transmitted from the injection molding machine 200. Before the injection molding machine 200 starts molding the molded article, the first control unit 211 of the injection molding machine 200 acquires the threshold value condition information from the second storage unit 302 of the cloud server 300 and stores the threshold value condition information in a storage apparatus (not shown). A portion where the same processing as the abnormality notification processing in the first embodiment shown in FIG. 4 is performed is denoted by the same reference numeral, and a description thereof will be omitted.

In step S701, when the operation data of the injection molding machine 200 exceeds the threshold value range, the first control unit 211 of the injection molding machine 200 generates the abnormality determination information. The first control unit 211 transmits the generated abnormality determination information to the molding management server 100.

In step S702, the first acquisition unit 110 acquires the abnormality determination information generated in step S701 from the injection molding machine 200.

In step S703, the sixth acquisition unit 130 acquires, from the injection molding machine 200 in the abnormality determination information acquired in step S702, operation data unrelated to the generation of the abnormality determination information in step S701. Specifically, when abnormality determination information on an abnormality in the temperature of the injection unit is generated in step S701, the sixth acquisition unit 130 acquires operation data other than the temperature of the injection unit from the same injection molding machine 200 in step S703. The operation data other than the temperature of the injection unit includes data on the injection pressure, data on the temperature of the mold, and the like. That is, each time the first acquisition unit 110 acquires the abnormality determination information from the injection molding machine 200, the sixth acquisition unit 130 acquires the operation data unrelated to the generation of the abnormality determination information. The sixth acquisition unit 130 stores the operation data acquired from the injection molding machine 200 in the first storage unit 102.

Figure 23:
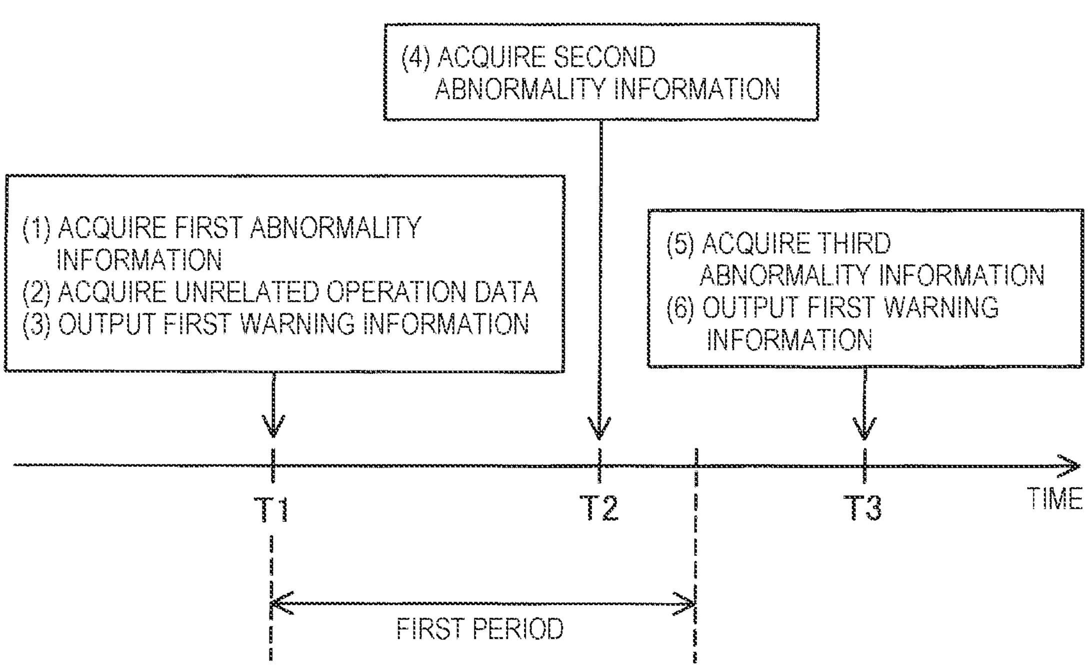
FIG. 23 is a time chart showing a timing when warning information is output in the sixth embodiment.

FIG. 23 is a time chart showing a timing when the warning information is output in the sixth embodiment. A description of the same portion as that in the time chart in the first embodiment shown in FIG. 6 will be omitted. In the sixth embodiment, the fourth abnormality information is not acquired.

When the first abnormality information is acquired at the time T1, the sixth acquisition unit 130 acquires operation data unrelated to generation of the first abnormality information from the injection molding machine 200 from which the first acquisition unit 110 acquires the first abnormality information. The acquisition, by the sixth acquisition unit 130, of the operation data unrelated to the generation of the first abnormality information corresponds to step S703 in the abnormality notification processing shown in FIG. 22. That is, each time the first acquisition unit 110 acquires the first abnormality information, the sixth acquisition unit 130 acquires the operation data unrelated to the generation of the first abnormality information from the injection molding machine 200 in the first abnormality information.

Each time the first acquisition unit 110 acquires the second abnormality information, the sixth acquisition unit 130 may acquire operation data unrelated to generation of the second abnormality information from the injection molding machine 200 in the second abnormality information. Each time the first acquisition unit 110 acquires the third abnormality information, the sixth acquisition unit 130 may acquire operation data unrelated to generation of the third abnormality information from the injection molding machine 200 in the third abnormality information.

According to the molding management system 10 in the sixth embodiment described above, each time the injection molding machine 200 generates the abnormality determination information and the first acquisition unit 110 acquires the abnormality determination information from the injection molding machine 200, the sixth acquisition unit 130 acquires the operation data unrelated to the generation of the abnormality determination information from the injection molding machine 200. Each time the first acquisition unit 110 acquires the first abnormality information, the sixth acquisition unit 130 acquires the operation data unrelated to the generation of the first abnormality information from the injection molding machine 200 in the first abnormality information. Therefore, since a size of the acquired operation data can be reduced as compared with a case where the molding management server 100 acquires the operation data from the injection molding machine 200 each time the molding of the molded article is completed in the injection molding machine 200, a load of communication between the molding management server 100 and the injection molding machine 200 can be reduced.

G. Seventh Embodiment

FIG. 24 is an explanatory diagram showing a schematic configuration of the molding management system 10 in a seventh embodiment. In the seventh embodiment, the first processing unit 101 of the molding management server 100 further includes acquisition unit 140 and a generation unit 150. In the first embodiment, the second processing unit 301 of the cloud server 300 includes the first output unit 310 and the second output unit 320. In contrast, in the seventh embodiment, the second processing unit 301 includes the first output unit 310. The configuration of each unit of the molding management system 10 other than the molding management server 100 and the cloud server 300 is the same as that in the first embodiment. In the seventh embodiment, the second warning information output processing is not performed.

The seventh acquisition unit 140 and the generation unit 150 are implemented by the first processing unit 101 executing a program stored in the first storage unit 102. Alternatively, each of the seventh acquisition unit 140 and the generation unit 150 may be implemented by a circuit.

The seventh acquisition unit 140 acquires the operation data from the injection molding machine 200.

The generation unit 150 generates the abnormality determination information based on the operation data acquired by the seventh acquisition unit 140 and the information on the threshold value of the operation data.

Hereinafter, the abnormality notification processing performed in the seventh embodiment will be described with reference to FIG. 4. A description of a portion where the same processing as the abnormality notification processing performed in the first embodiment is performed is omitted.

In the seventh embodiment, in step S105 in the abnormality notification processing, the seventh acquisition unit 140 acquires the operation data of the injection molding machine 200 transmitted from the injection molding machine 200.

In the seventh embodiment, when it is determined in step S110 in the abnormality notification processing that the operation data exceeds the threshold value range, the generation unit 150 generates the abnormality determination information in step S115.

In the time chart shown in FIG. 6, the first abnormality information acquired at the time T1 is the abnormality determination information generated by the generation unit 150. The second abnormality information acquired at the time T2 and the third abnormality information acquired at the time T3 may also be abnormality determination information generated by the generation unit 150.

According to the molding management system 10 in the seventh embodiment described above, when the seventh acquisition unit 140 determines that the operation data acquired from the injection molding machine 200 exceeds the threshold value range, the generation unit 150 generates the abnormality determination information. The first abnormality information is abnormality determination information generated by the generation unit 150. Therefore, as in the molding management system 10 in the first embodiment, the warning information is not notified to the user each time the abnormality determination information including the same identification information of the injection molding machine 200 and the same type name of the measurement value is acquired. Therefore, since information indicating that an abnormality of a specific type occurs in a specific injection molding machine 200 is not notified to the user several times, when information indicating that an abnormality of another type occurs in the specific injection molding machine 200 or information indicating that an abnormality occurs in another injection molding machine 200 is notified to the user, a possibility that the user overlooks such information can be reduced.

H. Eighth Embodiment

Figure 25:
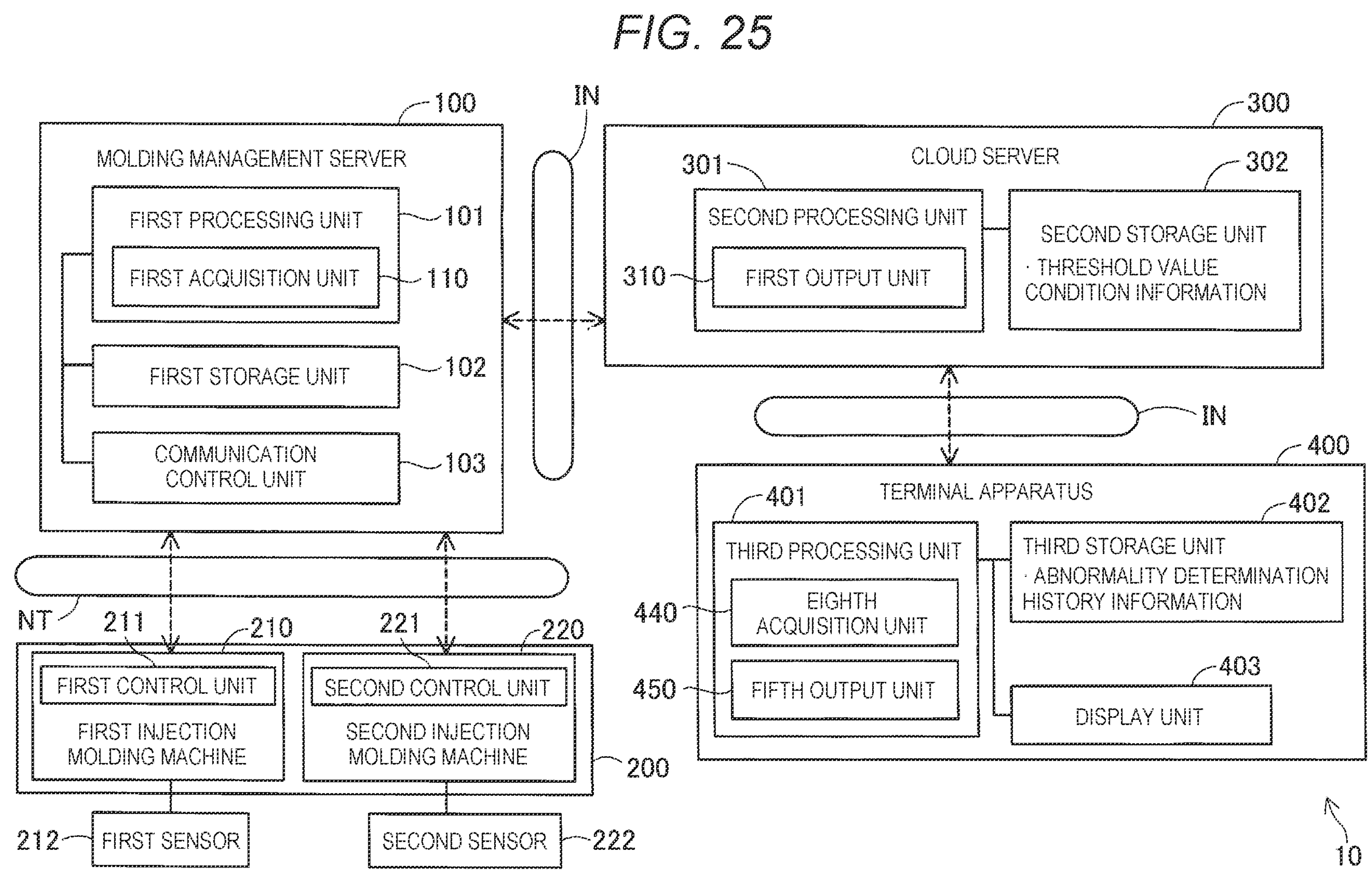
FIG. 25 is an explanatory diagram showing a schematic configuration of a molding management system in an eighth embodiment.

FIG. 25 is an explanatory diagram showing a schematic configuration of the molding management system 10 in an eighth embodiment. In the second embodiment, the second processing unit 301 of the cloud server 300 includes the first output unit 310 and the third acquisition unit 330. In contrast, in the eighth embodiment, the second processing unit 301 of the cloud server 300 includes the first output unit 310. In the second embodiment, the third processing unit 401 of the terminal apparatus 400 includes the second acquisition unit 410 and the third output unit 420. In contrast, in the eighth embodiment, the third processing unit 401 of the terminal apparatus 400 includes an eighth acquisition unit 440 and a fifth output unit 450. In the second embodiment, the abnormality determination history information is stored in the first storage unit 102 of the molding management server 100, and the threshold value condition information and the warning history information are stored in the second storage unit 302 of the cloud server 300. In contrast, in the eighth embodiment, the threshold value condition information is stored in the second storage unit 302 of the cloud server 300, and the abnormality determination history information is stored in the third storage unit 402 of the terminal apparatus 400. The configuration of each unit of the molding management system 10 other than the molding management server 100, the cloud server 300, and the terminal apparatus 400 is the same as that in the second embodiment. The molding management server 100 and the cloud server 300 are also collectively referred to as a server.

The eighth acquisition unit 440 and the fifth output unit 450 are implemented by the third processing unit 401 executing a program.

The eighth acquisition unit 440 acquires the warning information.

The fifth output unit 450 outputs the warning notification information. The warning notification information is information notifying that an abnormality occurs in the injection molding machine 200.

Figure 26:
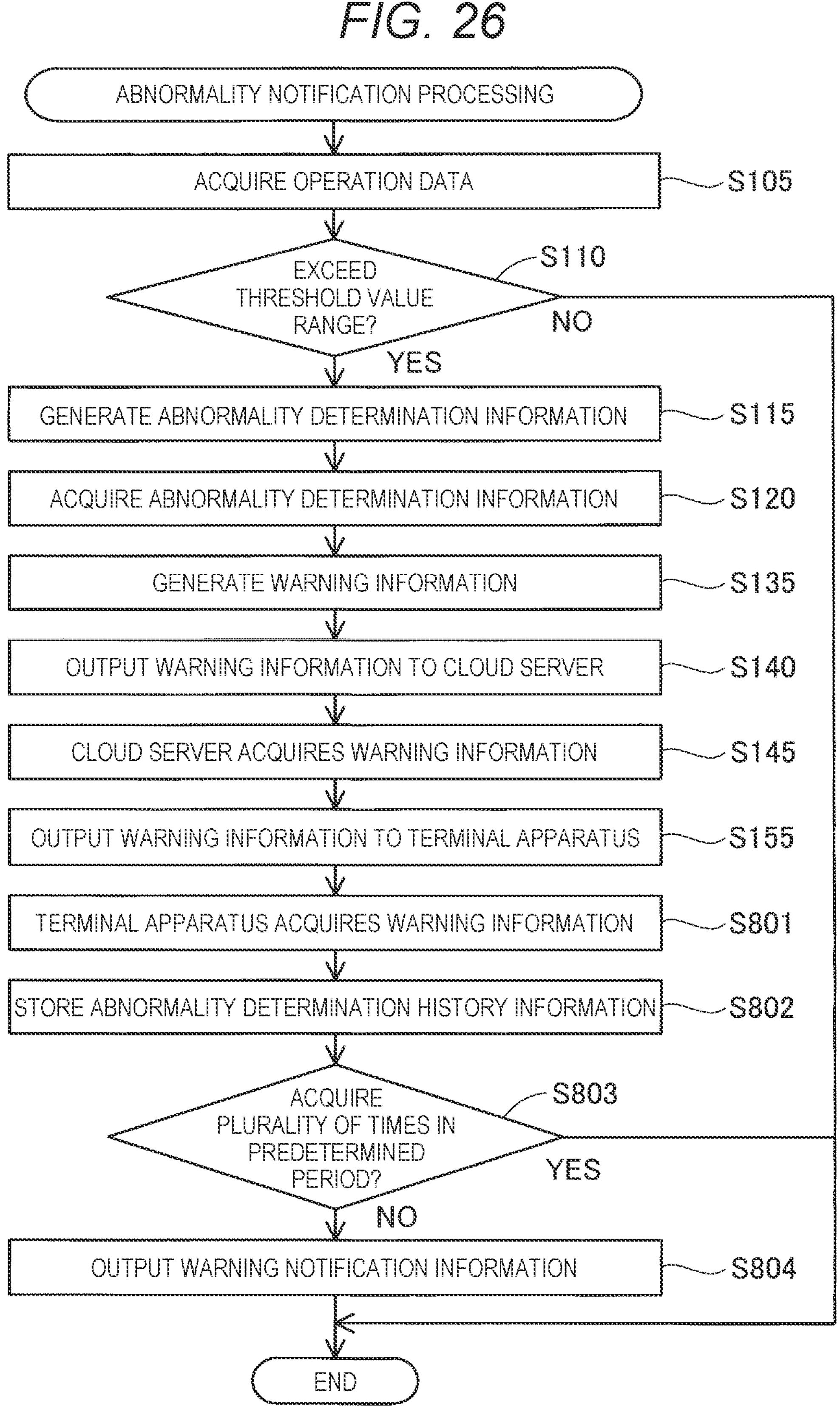
FIG. 26 is a flowchart of abnormality notification processing performed in the eighth embodiment.

FIG. 26 is a flowchart of the abnormality notification processing performed in the eighth embodiment. A portion where the same processing as the abnormality notification processing in the first embodiment shown in FIG. 4 is performed is denoted by the same reference numeral, and a description thereof will be omitted.

In the eighth embodiment, after the abnormality determination information is acquired in step S120, the warning information is generated in step S135. The warning information generated in step S135 includes the abnormality determination information acquired in step S120 and information on date-and-time when the warning information is generated.

In the eighth embodiment, after the second processing unit 301 of the cloud server 300 acquires the warning information in step S145, the first output unit 310 outputs the warning information to the terminal apparatus 400 in step S155.

In step S801, the eighth acquisition unit 440 of the terminal apparatus 400 acquires the warning information output in step S155.

In step S802, the third processing unit 401 of the terminal apparatus 400 stores, in the third storage unit 402, the abnormality determination information in the warning information acquired in step S801 as the abnormality determination history information. In other words, the third processing unit 401 adds a record of the abnormality determination history information to the third storage unit 402. The abnormality determination history information includes the abnormality determination information, an abnormality determination history ID, and an abnormality-determination-related code.

The abnormality-determination-related code is an abnormality determination history ID of its own abnormality determination history information or an abnormality determination history ID of abnormality determination history information already stored in the third storage unit 402. First, a case where the same warning information is not acquired in a predetermined period will be described. The same warning information refers to warning information including the identification information of the injection molding machine 200 and the type name of the measurement value that match the identification information of the injection molding machine 200 and the type name of the measurement value in the warning information acquired in step S801. The predetermined period is a period from a predetermined time point to a time point when the warning information is acquired in step S801. The predetermined period is, for example, 30 minutes immediately before the warning information is acquired in step S801 or 10 minutes immediately before the warning information is acquired in step S801. The predetermined period may be stored in the third storage unit 402 in advance or may be specified by the user. In the above-described case, the abnormality-determination-related code of the abnormality determination history information stored in the third storage unit 402 in step S802 is the abnormality determination history ID of its own abnormality determination history information. Next, a case where the same warning information is acquired in the predetermined period will be described. In this case, the abnormality-determination-related code of the abnormality determination history information stored in the third storage unit 402 in step S802 is the abnormality determination history ID of the abnormality determination history information including the same abnormality determination information as that generated first within the predetermined period.

In step S803, the third processing unit 401 determines whether the same warning information is acquired in the predetermined period. That is, the third processing unit 401 determines whether the abnormality determination history information including the same abnormality-determination-related code as the abnormality-determination-related code of the abnormality determination history information stored in the third storage unit 402 in step S802 is stored in the third storage unit 402.

When it is determined in step S803 that the same warning information is not acquired in the predetermined period, step S804 is performed. When it is determined in step S803 that the same warning information is acquired in the predetermined period, the third processing unit 401 ends the abnormality notification processing.

In step S804, the fifth output unit 450 of the terminal apparatus 400 outputs the warning notification information. The fifth output unit 450 causes the display unit 403 to display the warning information notification screen SC3 shown in FIG. 8. The fifth output unit 450 may cause the terminal apparatus 400 to output a warning sound or may cause the terminal apparatus 400 to vibrate. In the eighth embodiment, the abnormality resolution button BT2 may not be provided on the warning information notification screen SC3.

Hereinafter, processing performed by the molding management system 10 when a plurality of pieces of warning information including the same identification information of the injection molding machine 200 and the same type name of the measurement value are acquired at time intervals will be described.

Figure 27:
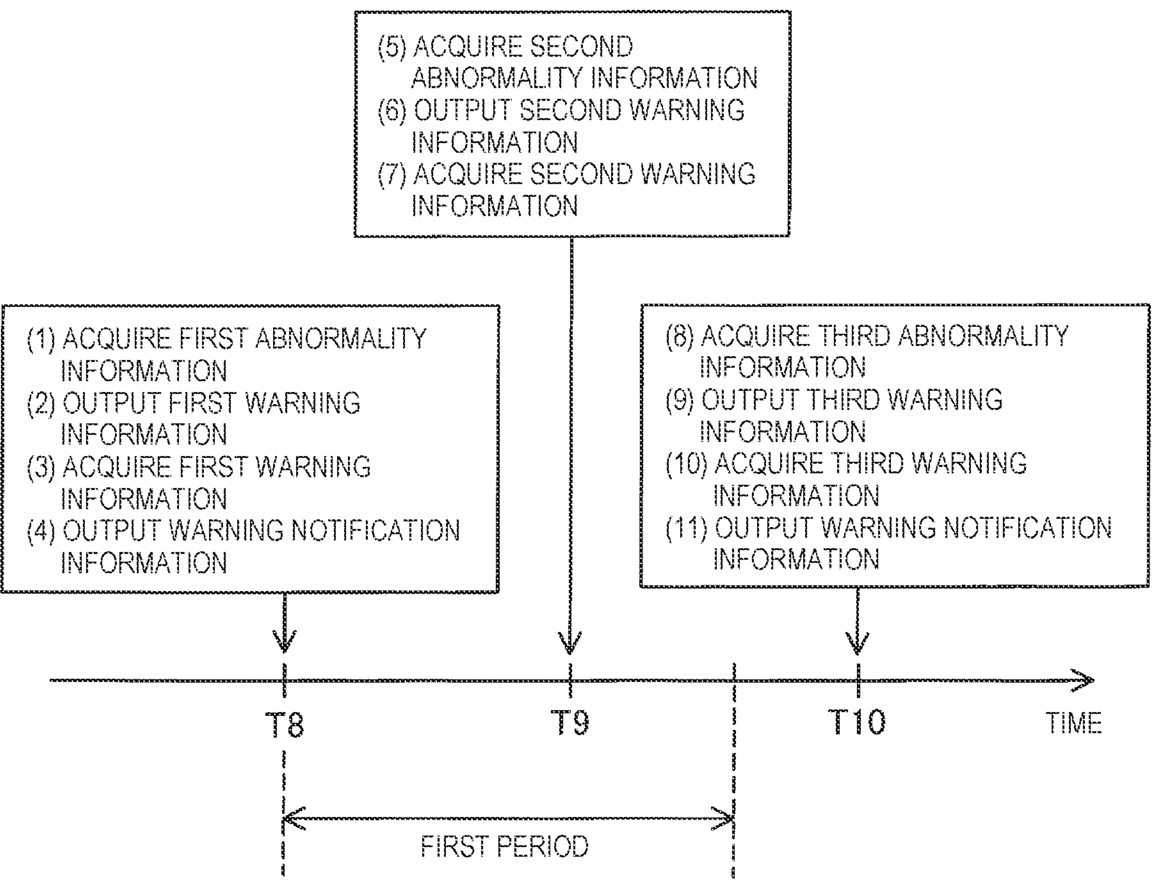
FIG. 27 is a time chart showing a timing when warning notification information is output.

FIG. 27 is a time chart showing a timing when the warning notification information is output. FIG. 27 shows a case where one piece of warning information including the same identification information of the injection molding machine 200 and the same type name of the measurement value is acquired after one piece of warning information is acquired and before the first period elapses therefrom, and one piece of warning information including the same identification information of the injection molding machine 200 and the same type name of the measurement value is acquired after the first period elapses.

First, at time T8, the first acquisition unit 110 of the molding management server 100 acquires the first abnormality information, which is the abnormality determination information. The acquisition of the first abnormality information by the first acquisition unit 110 corresponds to step S120 in the abnormality notification processing shown in FIG. 26.

When the first acquisition unit 110 acquires the first abnormality information, the first output unit 310 of the cloud server 300 outputs the first warning information to the terminal apparatus 400. The first warning information is warning information including the first abnormality information. The output of the first warning information by the first output unit 310 corresponds to step S155 in the abnormality notification processing shown in FIG. 26.

When the first output unit 310 outputs the first warning information, the eighth acquisition unit 440 of the terminal apparatus 400 acquires the first warning information. The acquisition of the first warning information by the eighth acquisition unit 440 corresponds to step S801 in the abnormality notification processing shown in FIG. 26. It is assumed that the eighth acquisition unit 440 does not acquire any warning information including the same identification information of the injection molding machine 200 and the same type name of the measurement value during a period from a time point preceding the time T8 by the first period to the time T8.

When the eighth acquisition unit 440 acquires the first warning information, the fifth output unit 450 of the terminal apparatus 400 outputs the warning notification information. The output of the warning notification information by the fifth output unit 450 corresponds to step S804 in the abnormality notification processing shown in FIG. 26. A reason why the warning notification information is output when the eighth acquisition unit 440 acquires the first warning information is that it is determined that the same warning information is not acquired in the predetermined period when the first period is used as the predetermined period in step S803 in the abnormality notification processing.

At time T9, the first acquisition unit 110 of the molding management server 100 acquires the second abnormality information. The second abnormality information is abnormality determination information including the identification information of the injection molding machine 200 and the type name of the measurement value in the first abnormality information. The time T9 is a time before the first period elapses from the time T8. The acquisition of the second abnormality information by the first acquisition unit 110 corresponds to step S120 in the abnormality notification processing shown in FIG. 26.

When the first acquisition unit 110 acquires the second abnormality information, the first output unit 310 of the cloud server 300 outputs the second warning information to the terminal apparatus 400. The second warning information is warning information including the second abnormality information. The output of the second warning information by the first output unit 310 corresponds to step S155 in the abnormality notification processing shown in FIG. 26.

When the first output unit 310 outputs the second warning information, the eighth acquisition unit 440 of the terminal apparatus 400 acquires the second warning information. That is, after acquiring the first warning information, the eighth acquisition unit 440 acquires the second warning information before the first period elapses from the time point when the first warning information is acquired. The acquisition of the second warning information by the eighth acquisition unit 440 corresponds to step S801 in the abnormality notification processing shown in FIG. 26.

When the eighth acquisition unit 440 acquires the second warning information, the fifth output unit 450 of the terminal apparatus 400 does not output the warning notification information. That is, step S804 in the abnormality notification processing shown in FIG. 26 is not performed. A reason why the warning notification information is not output when the eighth acquisition unit 440 acquires the second warning information is that it is determined that the same warning information is acquired in the predetermined period when the first period is used as the predetermined period in step S803 in the abnormality notification processing.

At time T10, the first acquisition unit 110 of the molding management server 100 acquires the third abnormality information. The third abnormality information is abnormality determination information including the identification information of the injection molding machine 200 and the type name of the measurement value in the first abnormality information. The time T10 is a time after the first period elapses from the time T8. The acquisition of the third abnormality information by the first acquisition unit 110 corresponds to step S120 in the abnormality notification processing shown in FIG. 26.

When the first acquisition unit 110 acquires the third abnormality information, the first output unit 310 of the cloud server 300 outputs the third warning information to the terminal apparatus 400. The third warning information is warning information including the third abnormality information. The output of the third warning information by the first output unit 310 corresponds to step S155 in the abnormality notification processing shown in FIG. 26.

When the first output unit 310 outputs the third warning information, the eighth acquisition unit 440 of the terminal apparatus 400 acquires the third warning information. That is, after acquiring the first warning information, the eighth acquisition unit 440 acquires the third warning information after the first period elapses from the time point when the first warning information is acquired. The acquisition of the third warning information by the eighth acquisition unit 440 corresponds to step S801 in the abnormality notification processing shown in FIG. 26.

When the eighth acquisition unit 440 acquires the third warning information, the fifth output unit 450 of the terminal apparatus 400 outputs the warning notification information. The output of the warning notification information by the fifth output unit 450 corresponds to step S804 in the abnormality notification processing shown in FIG. 26. A reason why the warning notification information is output when the eighth acquisition unit 440 acquires the third warning information is that it is determined that the same warning information is not acquired in the predetermined period when the first period is used as the predetermined period in step S803 in the abnormality notification processing.

According to the molding management system 10 in the eighth embodiment described above, even when the warning information is acquired in the abnormality notification processing, when it is determined that the warning information including the same identification information of the injection molding machine 200 and the same type name of the measurement value is acquired in the predetermined period, the warning notification information is not output, and the information indicating that the abnormality occurs in the injection molding machine 200 is not notified to the user. When it is determined that the warning information including the same identification information of the injection molding machine 200 and the same type name of the measurement value is not acquired in the predetermined period, the warning notification information is output, and the information indicating that the abnormality occurs in the injection molding machine 200 is notified to the user. When the second warning information is acquired after the first warning information is acquired and before the first period elapses from the time point when the first warning information is acquired, warning the notification information is not output. As described above, in the present embodiment, the warning notification information is not notified to the user each time the warning information including the same identification information of the injection molding machine 200 and the same type name of the measurement value is acquired. Therefore, since information indicating that an abnormality of a specific type occurs in a specific injection molding machine 200 is not notified to the user several times, when information indicating that an abnormality of another type occurs in the specific injection molding machine 200 or information indicating that an abnormality occurs in another injection molding machine 200 is notified to the user, a possibility that the user overlooks such information can be reduced.

I. Other Embodiments (I-1) In the first embodiment, the second processing unit 301 of the cloud server 300 includes the second output unit 320. In contrast, the second processing unit 301 of the cloud server 300 may not include the second output unit 320. In this case, in the time chart shown in FIG. 6, the fourth abnormality information may not be acquired at the time T4. Even when the fourth abnormality information is acquired at the time T4, the second warning information may not be output.

(I-2) In the eighth embodiment, in the abnormality notification processing, when it is determined that the warning information including the same identification information of the injection molding machine 200 and the same type name of the measurement value is not acquired in the predetermined period, the warning notification information is output. In contrast, as in the first embodiment, when it is determined that the abnormality determination information including the same identification information of the injection molding machine 200 and the same type name of the measurement value is not generated in the predetermined period, the warning notification information may be output.

(I-3) In the above embodiments, one upper limit value of the threshold value and one lower limit value of the threshold value are set as the threshold value condition information. In contrast, as the threshold value condition information, a plurality of upper limit values of the threshold value set with reference to a reference value may be set, or a plurality of lower limit values of the threshold value set with reference to the reference value may be set. Here, the reference value is a set value of a measurement value for which the threshold value condition information in the molding condition is set.

J. Other Aspects

The disclosure is not limited to the above embodiments, and can be implemented in various forms without departing from the spirit of the disclosure. For example, the disclosure can be implemented in the following aspects. In order to solve a part of or all of problems in the disclosure, or to attain a part of or all of effects in the disclosure, technical features in the above embodiments corresponding to technical features in each of the following aspects can be replaced or combined as appropriate. The technical features can be deleted as appropriate unless described as being essential in the specification.

(1) According to an aspect of the disclosure, a molding management system is provided. The molding management system is a molding management system that manages an injection molding machine, the molding management system including: a first acquisition unit configured to acquire first abnormality information, second abnormality information, and third abnormality information including information on the injection molding machine and information on a type of an abnormality occurring in the injection molding machine; and a first output unit configured to output first warning information that is information notifying that the abnormality occurs in the injection molding machine, in which the second abnormality information and the third abnormality information include the information on the injection molding machine in the first abnormality information and the information on the type of the abnormality in the injection molding machine in the first abnormality information, the first acquisition unit acquires the second abnormality information after acquiring the first abnormality information and before a first period elapses from a time point when the first abnormality information is acquired, and acquires the third abnormality information after acquiring the first abnormality information and after the first period elapses from the time point when the first abnormality information is acquired, and the first output unit outputs the first warning information when the first acquisition unit acquires the first abnormality information, does not output the first warning information when the first unit acquires the second acquisition abnormality information, and outputs the first warning information when the first acquisition unit acquires the third abnormality information.

According to the molding management system in this aspect, when the second abnormality information is acquired among the first abnormality information, the second abnormality information, and the third abnormality information, which are information indicating that an abnormality of a specific type occurs in a specific injection molding machine, the first warning information is not output. Therefore, it is possible to reduce the number of times a user is notified of the information indicating that the abnormality of the specific type occurs in the specific injection molding machine. Therefore, when the user is notified of information indicating that an abnormality of another type occurs in the specific injection molding machine or information indicating that an abnormality occurs in another injection molding machine, a possibility that the user overlooks such information can be reduced.

(2) In the above-described aspect, the molding management system may further include a second output unit configured to output second warning information that is information notifying that the abnormality occurs in the injection molding machine, in which the first acquisition unit acquires fourth abnormality information including the information on the injection molding machine and the information on the type of the abnormality occurring in the injection molding machine, the fourth abnormality information includes the information on the injection molding machine in the first abnormality information and the information on the type of the abnormality in the injection molding machine in the first abnormality information, the first acquisition unit acquires the third abnormality information after acquiring the first abnormality information and before a second period elapses from the time point when the first abnormality information is acquired, the second period being a period longer than the first period, and acquires the fourth abnormality information after acquiring the first abnormality information and after the second period elapses from the time point when the first abnormality information is acquired, and the second output unit does not output the second warning information to an output destination different from an output destination of the first warning information when the first acquisition unit acquires the third abnormality information, and outputs the second warning information to the output destination different from the output destination of the first warning information when the first acquisition unit acquires the fourth abnormality information. According to the molding management system in this aspect, since the second warning information is output to the output destination different from the output destination of the first warning information, a possibility that the user overlooks the occurrence of the abnormality in the injection molding machine can be reduced.

(3) In the above-described aspects, the molding management system may further include: an apparatus; a third acquisition unit; and a storage unit, in which the apparatus includes: a second acquisition unit configured to acquire the first warning information; and a third output unit configured to output abnormality resolution information that is information indicating that the abnormality occurring in the injection molding machine is resolved, the third output unit being configured to output the abnormality resolution information on the injection molding machine and the type of the abnormality in the first warning information acquired by the second acquisition unit, the third acquisition unit acquires the abnormality resolution information output by the third output unit, and at least one of the first abnormality information, the second abnormality information, and the third abnormality information is stored in the storage unit in association with the abnormality resolution information acquired by the third acquisition unit.

According to the molding management system in this aspect, when the abnormality occurring in the injection molding machine is resolved, the information indicating that the abnormality is resolved can be stored in the storage unit.

(4) In the above-described aspects, the molding management system may further include: a storage unit configured to store information on a threshold value of operation data of the injection molding machine; an apparatus; and an input unit configured to receive input of abnormality resolution information to the apparatus, the abnormality resolution information being information indicating that the abnormality occurring in the injection molding machine is resolved, in which the apparatus includes: a second acquisition unit configured to acquire the first warning information; a fourth acquisition unit configured to acquire, from the storage unit, the information on the threshold value of the operation data of the injection molding machine in the first warning information acquired by the second acquisition unit; and a display unit configured to display the information on the threshold value of the operation data of the injection molding machine acquired by the fourth acquisition unit, the input unit receives the input of the abnormality resolution information on the injection molding machine and the type of the abnormality in the first warning information, and at least one of the first abnormality information, the second abnormality information, and the third abnormality information is stored in the storage unit in association with the abnormality resolution information received by the input unit.

According to the molding management system in this aspect, the user can check the information on the threshold value of the operation data of the injection molding machine when resolving the abnormality occurring in the injection molding machine.

(5) In the above-described aspects, the display unit may display a threshold value condition setting screen that enables updating of the information on the threshold value of the operation data of the injection molding machine, and the abnormality resolution information on the injection molding machine and the abnormality in the first warning information may be allowed to be input on the threshold value condition setting screen.

According to the molding management system in this aspect, the abnormality occurring in the injection molding machine can be resolved by the user updating the information on the threshold value of the operation data of the injection molding machine.

(6) In the above-described aspects, the molding management system may further include: a fifth acquisition unit configured to acquire fifth abnormality information, sixth abnormality information, and seventh abnormality information including the information on the injection molding machine, information on peripheral equipment of the injection molding machine, and information on a type of an abnormality occurring in the peripheral equipment of the injection molding machine; and a fourth output unit configured to output third warning information that is information notifying that the abnormality occurs in the peripheral equipment of the injection molding machine, in which the sixth abnormality information and the seventh abnormality information include the information on the injection molding machine in the fifth abnormality information, the information on the peripheral equipment of the injection molding machine in the fifth abnormality information, and the information on the type of the abnormality in the peripheral equipment of the injection molding machine in the fifth abnormality information, the fifth acquisition unit acquires the sixth abnormality information after acquiring the fifth abnormality information and before a third period elapses from a time point when the fifth abnormality information is acquired, and acquires the seventh abnormality information after acquiring the fifth abnormality information and after the third period elapses from the time point when the fifth abnormality information is acquired, and the fourth output unit outputs the third warning information when the fifth acquisition unit acquires the fifth abnormality information, does not output the third warning information when the fifth acquisition unit acquires the sixth abnormality information, and outputs the third warning information when the fifth acquisition unit acquires the seventh abnormality information.

According to the molding management system in this aspect, when the sixth abnormality information is acquired among the fifth abnormality information, the sixth abnormality information, and the seventh abnormality information, which are information indicating that an abnormality of a specific type occurs in a specific piece of peripheral equipment, the third warning information is not output. Therefore, it is possible to reduce the number of times the user is notified of the information indicating that the abnormality of the specific type occurs in the specific piece of peripheral equipment. Therefore, when the user is notified of information indicating that an abnormality of another type occurs in the specific piece of peripheral equipment or information indicating that an abnormality occurs in another piece of peripheral equipment, a possibility that the user overlooks such information can be reduced.

(7) In the above-described aspects, the peripheral equipment may be an extraction apparatus, a mold temperature adjustment apparatus, a drying apparatus, a material supply apparatus, or an inspection apparatus.

(8) In the above-described aspects, the injection molding machine may generate the first abnormality information based on operation data of the injection molding machine and information on a threshold value of the operation data, the molding management system may further include a sixth acquisition unit configured to acquire the operation data from the injection molding machine, and each time the first acquisition unit acquires the first abnormality information, the sixth acquisition unit acquires, from the injection molding machine in the first abnormality information, the operation data unrelated to the generation of the first abnormality information.

According to the molding management system in this aspect, since the operation data unrelated to the generation of the first abnormality information is acquired from the injection molding machine each time the first abnormality information is acquired, it is possible to reduce a size of the acquired operation data as compared with a case where the operation data is acquired from the injection molding machine each time molding of a molded article is completed in the injection molding machine, and thus it is possible to reduce a communication load of the molding management system.

(9) In the above-described aspects, the injection molding machine may store operation data of the injection molding machine, and the molding management system may further include: a storage unit configured to store information on a threshold value of the operation data; a seventh acquisition unit configured to acquire the operation data from the injection molding machine; and a generation unit configured to generate the first abnormality information based on the operation data acquired by the seventh acquisition unit and the information on the threshold value of the operation data.

According to the molding management system in this aspect, when the operation data exceeds a threshold value range of the operation data, the information notifying that the abnormality occurs in the injection molding machine is output.

(10) According to another aspect of the disclosure, a molding management system is provided. The molding management system is a molding management system that manages an injection molding machine, the molding management system including: a server; and a terminal apparatus, in which the server includes: a first acquisition unit configured to acquire first abnormality information, second abnormality information, and third abnormality information including information on the injection molding machine and information on a type of an abnormality occurring in the injection molding machine; and a first output unit configured to output first warning information, second warning information, and third warning information that are information notifying that the abnormality occurs in the injection molding machine, the second abnormality information and the third abnormality information including the information on the injection molding machine in the first abnormality information and the information on the type of the abnormality in the injection molding machine in the first abnormality information, the first output unit being configured to output the first warning information to the terminal apparatus when the first acquisition unit acquires the first abnormality information, output the second warning information to the terminal apparatus when the first acquisition unit acquires the second abnormality information, and output the third warning information to the terminal apparatus when the first acquisition unit acquires the third abnormality information, and the terminal apparatus includes: an eighth acquisition unit configured to acquire the first warning information, the second warning information, and the third warning information; fifth output unit configured to output warning and a notification information that is information notifying that the abnormality occurs in the injection molding machine, the eighth acquisition unit being configured to acquire the second warning information after acquiring the first warning information and before a first period elapses from a time point when the first warning information is acquired, and acquire the third warning information after acquiring the first warning information and after the first period elapses from the time point when the first warning information is acquired, and the fifth output unit being configured to output the warning notification information when the eighth acquisition unit acquires the first warning information, not output the warning notification information when the eighth acquisition unit acquires the second warning information, and output the warning notification information when the eighth acquisition unit acquires the third warning information.

According to the molding management system in this aspect, when the second warning information is acquired among the first warning information, the second warning information, and the third warning information, which are information indicating that an abnormality of a specific type occurs in a specific injection molding machine, the warning notification information is not output. Therefore, it is possible to reduce the number of times a user is notified of the information indicating that the abnormality of the specific type occurs in the specific injection molding machine. Therefore, when the user is notified of information indicating that an abnormality of another type occurs in the specific injection molding machine or information indicating that an abnormality occurs in another injection molding machine, a possibility that the user overlooks such information can be reduced.

What is claimed is:

1. A molding management system that manages an injection molding machine, the molding management system comprising:

a first acquisition unit configured to acquire first abnormality information, second abnormality information, and third abnormality information including information on the injection molding machine and information on a type of an abnormality occurring in the injection molding machine; and a first output unit configured to output first warning information that is information notifying that the abnormality occurs in the injection molding machine, wherein the second abnormality information and the third abnormality information include the information on the injection molding machine in the first abnormality information and the information on the type of the abnormality in the injection molding machine in the first abnormality information, the first acquisition unit acquires the second abnormality information after acquiring the first abnormality information and before a first period elapses from a time point when the first abnormality information is acquired, and acquires the third abnormality information after acquiring the first abnormality information and after the first period elapses from the time point when the first abnormality information is acquired, and the first output unit outputs the first warning information when the first acquisition unit acquires the first abnormality information, does not output the first warning information when the first acquisition unit acquires the second abnormality information, and outputs the first warning information when the first acquisition unit acquires the third abnormality information, a threshold value condition setting screen that enables updating limit values of a threshold value of operation data to resolve the abnormality occurring in the injection molding machine; and wherein the injection molding machine starts operation of injection molding using the updated limit values.

2. The molding management system according to claim 1, further comprising:

a second output unit configured to output second warning information that is information notifying that the abnormality occurs in the injection molding machine, wherein the first acquisition unit acquires fourth abnormality information including the information on the injection molding machine and the information on the type of the abnormality occurring in the injection molding machine, the fourth abnormality information includes the information on the injection molding machine in the first abnormality information and the information on the type of the abnormality in the injection molding machine in the first abnormality information, the first acquisition unit acquires the third abnormality information after acquiring the first abnormality information and before a second period elapses from the time point when the first abnormality information is acquired, the second period being a period longer than the first period, and acquires the fourth abnormality information after acquiring the first abnormality information and after the second period elapses from the time point when the first abnormality information is acquired, and the second output unit does not output the second warning information to an output destination different from an output destination of the first warning information when the first acquisition unit acquires the third abnormality information, and outputs the second warning information to the output destination different from the output destination of the first warning information when the first acquisition unit acquires the fourth abnormality information.

3. The molding management system according to claim 1, further comprising:

an apparatus;

a third acquisition unit; and a storage unit, wherein the apparatus includes:

a second acquisition unit configured to acquire the first warning information; and a third output unit configured to output abnormality resolution information that is information indicating that the abnormality occurring in the injection molding machine is resolved, the third output unit being configured to output the abnormality resolution information on the injection molding machine and the type of the abnormality in the first warning information acquired by the second acquisition unit, the third acquisition unit acquires the abnormality resolution information output by the third output unit, and at least one of the first abnormality information, the second abnormality information, and the third abnormality information is stored in the storage unit in association with the abnormality resolution information acquired by the third acquisition unit.

4. The molding management system according to claim 1, further comprising:

a storage unit configured to store information on the threshold value of operation data of the injection molding machine;

an apparatus; and an input unit configured to receive input of abnormality resolution information to the apparatus, the abnormality resolution information being information indicating that the abnormality occurring in the injection molding machine is resolved, wherein the apparatus includes:

a second acquisition unit configured to acquire the first warning information;

a fourth acquisition unit configured to acquire, from the storage unit, the information on the threshold value of the operation data of the injection molding machine in the first warning information acquired by the second acquisition unit; and a display unit configured to display the information on the threshold value of the operation data of the injection molding machine acquired by the fourth acquisition unit, the input unit receives the input of the abnormality resolution information on the injection molding machine and the type of the abnormality in the first warning information, and at least one of the first abnormality information, the second abnormality information, and the third abnormality information is stored in the storage unit in association with the abnormality resolution information received by the input unit.

5. The molding management system according to claim 4, wherein the display unit displays the threshold value condition setting screen that enables updating of the information on the threshold value of the operation data of the injection molding machine, and the abnormality resolution information on the injection molding machine and the abnormality in the first warning information is allowed to be input on the threshold value condition setting screen.

6. The molding management system according to claim 1, further comprising:

a fifth acquisition unit configured to acquire fifth abnormality information, sixth abnormality information, and seventh abnormality information including the information on the injection molding machine, information on peripheral equipment of the injection molding machine, and information on a type of an abnormality occurring in the peripheral equipment of the injection molding machine; and a fourth output unit configured to output third warning information that is information notifying that the abnormality occurs in the peripheral equipment of the injection molding machine, wherein the sixth abnormality information and the seventh abnormality information include the information on the injection molding machine in the fifth abnormality information, the information on the peripheral equipment of the injection molding machine in the fifth abnormality information, and the information on the type of the abnormality in the peripheral equipment of the injection molding machine in the fifth abnormality information, the fifth acquisition unit acquires the sixth abnormality information after acquiring the fifth abnormality information and before a third period elapses from a time point when the fifth abnormality information is acquired, and acquires the seventh abnormality information after acquiring the fifth abnormality information and after the third period elapses from the time point when the fifth abnormality information is acquired, and the fourth output unit outputs the third warning information when the fifth acquisition unit acquires the fifth abnormality information, does not output the third warning information when the fifth acquisition unit acquires the sixth abnormality information, and outputs the third warning information when the fifth acquisition unit acquires the seventh abnormality information.

7. The molding management system according to claim 6, wherein the peripheral equipment is an extraction apparatus, a mold temperature adjustment apparatus, a drying apparatus, a material supply apparatus, or an inspection apparatus.

8. The molding management system according to claim 1, wherein the injection molding machine generates the first abnormality information based on operation data of the injection molding machine and information on the threshold value of the operation data, the molding management system further includes a sixth acquisition unit configured to acquire the operation data from the injection molding machine, and each time the first acquisition unit acquires the first abnormality information, the sixth acquisition unit acquires, from the injection molding machine in the first abnormality information, the operation data unrelated to the generation of the first abnormality information.

9. The molding management system according to claim 1, wherein the injection molding machine stores operation data of the injection molding machine, and the molding management system further includes:

a storage unit configured to store information on a threshold value of the operation data;

a seventh acquisition unit configured to acquire the operation data from the injection molding machine; and a generation unit configured to generate the first abnormality information based on the operation data acquired by the seventh acquisition unit and the information on the threshold value of the operation data.

10. A molding management system that manages an injection molding machine, the molding management system comprising:

a server; and a terminal apparatus, wherein the server includes:

a first acquisition unit configured to acquire first abnormality information, second abnormality information, and third abnormality information including information on the injection molding machine and information on a type of an abnormality occurring in the injection molding machine; and a first output unit configured to output first warning information, second warning information, and third warning information that are information notifying that the abnormality occurs in the injection molding machine, the second abnormality information and the third abnormality information including the information on the injection molding machine in the first abnormality information and the information on the type of the abnormality in the injection molding machine in the first abnormality information, the first output unit being configured to output the first warning information to the terminal apparatus when the first acquisition unit acquires the first abnormality information, output the second warning information to the terminal apparatus when the first acquisition unit acquires the second abnormality information, and output the third warning information to the terminal apparatus when the first acquisition unit acquires the third abnormality information, and the terminal apparatus includes:

an eighth acquisition unit configured to acquire the first warning information, the second warning information, and the third warning information; and a fifth output unit configured to output warning notification information that is information notifying that the abnormality occurs in the injection molding machine, the eighth acquisition unit being configured to acquire the second warning information after acquiring the first warning information and before a first period elapses from a time point when the first warning information is acquired, and acquire the third warning information after acquiring the first warning information and after the first period elapses from the time point when the first warning information is acquired, and the fifth output unit being configured to output the warning notification information when the eighth acquisition unit acquires the first warning information, not output the warning notification information when the eighth acquisition unit acquires the second warning information, and output the warning notification information when the eighth acquisition unit acquires the third warning information, a threshold value condition setting screen that enables updating limit values of a threshold value of operation data to resolve the abnormality occurring in the injection molding machine; and wherein the injection molding machine starts operation of injection molding using the updated limit values.

* * * * *